United States Patent
Kajiwara et al.

(10) Patent No.: US 7,613,345 B2
(45) Date of Patent: Nov. 3, 2009

(54) IMAGE CODING APPARATUS AND IMAGE DECODING APPARATUS AND THEIR CONTROL METHODS, AND COMPUTER PROGRAM AND COMPUTER-READABLE STORAGE MEDIUM

(75) Inventors: Hiroshi Kajiwara, Tokyo (JP); Yuki Matsumoto, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 11/119,920

(22) Filed: May 3, 2005

(65) Prior Publication Data
US 2005/0249283 A1      Nov. 10, 2005

(30) Foreign Application Priority Data
May 7, 2004    (JP) .............................. 2004-139098
Jan. 13, 2005  (JP) .............................. 2005-006668

(51) Int. Cl.
*G06K 9/36* (2006.01)
*G06K 9/46* (2006.01)
(52) U.S. Cl. .................. 382/232; 382/238; 382/239
(58) Field of Classification Search ................. 382/232, 382/238, 239
See application file for complete search history.

(56) References Cited

U.S. PATENT DOCUMENTS

| | | | |
|---|---|---|---|
| 5,247,357 A | 9/1993 | Israelsen | ...................... 358/133 |
| 5,402,248 A | 3/1995 | Sato et al. | .................... 358/426 |
| 5,701,367 A | 12/1997 | Koshi et al. | ................. 382/239 |
| 5,742,704 A * | 4/1998 | Suzuki et al. | ................ 382/176 |
| 5,764,804 A * | 6/1998 | Yajima et al. | ................ 382/238 |

(Continued)

FOREIGN PATENT DOCUMENTS

JP      07-123273      5/1995

(Continued)

OTHER PUBLICATIONS

Block-based segmentation and adaptive coding for visually lossless compression of scanned documents, Xin Li; Shawmin Lei; Proceedings of International Conference on Image Processing, 2001. vol. 3, 450-453.*

*Primary Examiner*—Samir A. Ahmed
*Assistant Examiner*—Li Liu
(74) *Attorney, Agent, or Firm*—Fitzpatrick, Cella, Harper & Scinto

(57) ABSTRACT

An image coding apparatus for efficient coding on image data having discrete pixel values such as a CG image or a limited color image as well as a natural image where pixel value changes are mild. For this purpose, a tile dividing unit divides multi-valued image data into tiles. An occurred level count unit outputs the result of counting of the number of brightness values in the tile to a comparison unit and outputs the existing brightness values to an index table generation unit. The index table generation unit allocates continuous index values to the existing brightness values, and stores the result of allocation into an index memory table. An index conversion unit replaces the input pixel values in the tile with index values, and outputs the index values to a selector. The selector selects one of the brightness values in the tile or the index values based on the result of comparison by the comparison unit, and outputs the selected values to a tile data predictive coding unit so as to perform predictive coding processing.

15 Claims, 22 Drawing Sheets

U.S. PATENT DOCUMENTS

| | | | | |
|---|---|---|---|---|
| 5,889,596 | A | 3/1999 | Yaguchi et al. | 358/448 |
| 5,945,930 | A | 8/1999 | Kajiwara | 341/50 |
| 5,960,116 | A | 9/1999 | Kajiwara | 382/238 |
| 6,028,963 | A | 2/2000 | Kajiwara | 382/239 |
| 6,031,938 | A | 2/2000 | Kajiwara | 382/239 |
| 6,067,382 | A | 5/2000 | Maeda | 382/239 |
| 6,094,510 | A | 7/2000 | Yaguchi et al. | 382/232 |
| 6,097,364 | A | 8/2000 | Miyamoto et al. | 345/97 |
| 6,101,282 | A | 8/2000 | Hirabayashi et al. | 382/246 |
| 6,175,650 | B1* | 1/2001 | Sindhu et al. | 382/171 |
| 6,233,355 | B1 | 5/2001 | Kajiwara | 382/238 |
| 6,266,449 | B1 | 7/2001 | Ohsawa | 382/239 |
| 6,310,980 | B1 | 10/2001 | Kajiwara | 382/238 |
| 6,501,859 | B1 | 12/2002 | Kajiwara | 382/239 |
| 6,549,676 | B1 | 4/2003 | Nakayama et al. | 382/246 |
| 6,560,365 | B1 | 5/2003 | Nakayama | 382/233 |
| 6,650,361 | B1 | 11/2003 | Shiomi | 348/218.1 |
| 6,665,444 | B1 | 12/2003 | Kajiwara | 382/240 |
| 6,711,295 | B2 | 3/2004 | Nakayama et al. | 382/232 |
| 6,768,819 | B2 | 7/2004 | Yamazaki et al. | 382/240 |
| 6,771,828 | B1 | 8/2004 | Malvar | 382/240 |
| 6,847,735 | B2 | 1/2005 | Kajiwara et al. | 382/233 |
| 6,853,755 | B2* | 2/2005 | Li | 382/239 |
| 6,879,726 | B2 | 4/2005 | Sato et al. | 382/239 |
| 6,879,727 | B2 | 4/2005 | Sato et al. | 382/239 |
| 6,917,716 | B2 | 7/2005 | Kajiwara et al. | 382/240 |
| 6,931,158 | B2 | 8/2005 | Malvar | 382/240 |
| 6,947,600 | B1 | 9/2005 | Sato et al. | 382/233 |
| 6,985,630 | B2 | 1/2006 | Kajiwara | 382/233 |
| 6,987,468 | B1* | 1/2006 | Malvar | 341/59 |
| 7,013,050 | B2 | 3/2006 | Kajiwara | 382/240 |
| 7,106,909 | B2 | 9/2006 | Satoh et al. | 382/289 |
| 7,106,911 | B2 | 9/2006 | Ohta et al. | 382/239 |
| 7,110,609 | B2 | 9/2006 | Malvar | 382/240 |
| 7,127,115 | B2 | 10/2006 | Osawa et al. | 382/233 |
| 7,136,531 | B2 | 11/2006 | Satoh | 375/240.03 |
| 7,194,140 | B2 | 3/2007 | Ito et al. | 358/462 |
| 7,215,818 | B2 | 5/2007 | Naito | 382/239 |
| 7,227,998 | B2 | 6/2007 | Nakayama et al. | 382/332 |
| 7,257,264 | B2 | 8/2007 | Nakayama et al. | 375/240.4 |
| 2003/0031371 | A1 | 2/2003 | Kato et al. | 382/239 |
| 2003/0063811 | A1 | 4/2003 | Kajiwara | 382/240 |
| 2003/0086597 | A1 | 5/2003 | Ohta et al. | 382/240 |
| 2003/0118242 | A1* | 6/2003 | Nakayama et al. | 382/245 |
| 2003/0164975 | A1 | 9/2003 | Aoyagi et al. | 358/1.15 |
| 2004/0013312 | A1 | 1/2004 | Kajiwara | 382/240 |
| 2004/0213347 | A1 | 10/2004 | Kajiwara et al. | 375/240.11 |
| 2005/0100226 | A1 | 5/2005 | Kajiwara et al. | 382/232 |
| 2005/0249283 | A1 | 11/2005 | Kajiwara et al. | 382/240.12 |
| 2006/0023957 | A1 | 2/2006 | Ito | 382/232 |
| 2006/0045362 | A1 | 3/2006 | Ito et al. | 382/232 |

FOREIGN PATENT DOCUMENTS

| | | |
|---|---|---|
| JP | A 10-004551 | 6/1998 |
| JP | A 10-004557 | 6/1998 |
| JP | 10-224640 | 8/1998 |
| JP | 2002-369198 A | 12/2002 |
| JP | 2003-008903 | 1/2003 |
| JP | 2003-209698 | 7/2003 |

* cited by examiner

FIG. 3

| BRIGHTNESS VALUE | F(R,i) | F(G,i) | F(B,i) |
|---|---|---|---|
| 0 | 0 | 0 | 0 |
| 1 | 1 | 0 | 0 |
| ⋮ | ⋮ | ⋮ | ⋮ |
| 100 | 0 | 1 | 1 |
| ⋮ | ⋮ | ⋮ | ⋮ |
| 254 | 0 | 1 | 0 |
| 255 | 0 | 0 | 0 |

↓ TOTAL VALUE NLV(R)　　↓ TOTAL VALUE NLV(G)　　↓ TOTAL VALUE NLV(B)

FIG. 5

| BRIGHTNESS VALUE | IDX(R,i) | IDX(G,i) | IDX(B,i) |
|---|---|---|---|
| 0 | -1 | -1 | -1 |
| 1 | 0 | -1 | -1 |
| ⋮ | ⋮ | ⋮ | ⋮ |
| 100 | -1 | 3 | 2 |
| ⋮ | ⋮ | ⋮ | ⋮ |
| 254 | -1 | 5 | -1 |
| 255 | -1 | -1 | -1 |

FIG. 8

| SYMBOL | CODE |
|---|---|
| 255 | 111 ····· 1110 |
| 254 | 111 ····· 1100 |
| ⋮ | ⋮ |
| 3 | 11100 |
| 2 | 1100 |
| 1 | 100 |
| 0 | 00 |
| -1 | 01 |
| -2 | 101 |
| -3 | 1101 |
| ⋮ | ⋮ |
| -254 | 111 ····· 1101 |
| -255 | 111 ····· 1111 |

FIG. 10A
WITH INDEX CONVERSION

| 0 | R CODED DATA | G CODED DATA | B CODED DATA |

FIG. 10B
WITHOUT INDEX CONVERSION

| 1~7 | INDEX CONVERSION TABLE INFORMATION | R CODED DATA | G CODED DATA | B CODED DATA |

FIG. 13

| INDEX i | BRIGHTNESS VALUE RIDX(R,i) | BRIGHTNESS VALUE GIDX(G,i) | BRIGHTNESS VALUE BIDX(B,i) |
|---|---|---|---|
| 0 | | | |
| 1 | | | |
| 2 | | | |
| 3 | | | |
| 4 | | | |

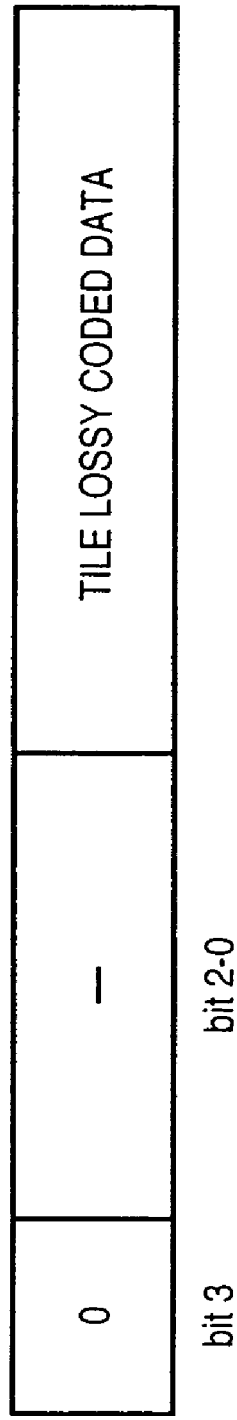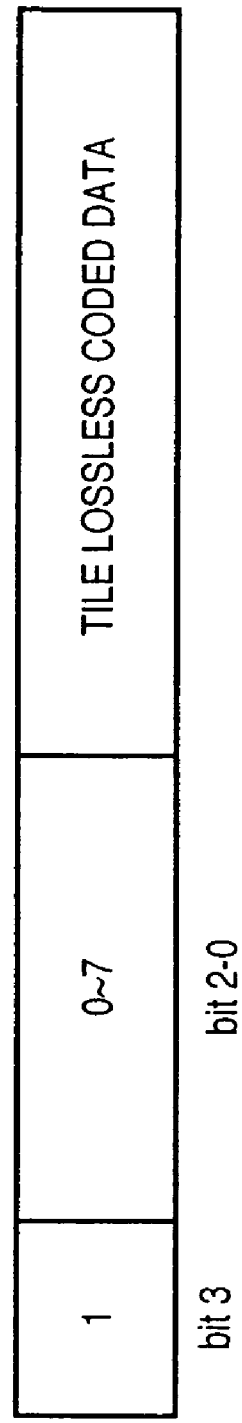

IMAGE CODING APPARATUS AND IMAGE DECODING APPARATUS AND THEIR CONTROL METHODS, AND COMPUTER PROGRAM AND COMPUTER-READABLE STORAGE MEDIUM

FIELD OF THE INVENTION

The present invention relates to an image data coding and decoding technique.

BACKGROUND OF THE INVENTION

Conventionally, an image processing apparatus based on predictive coding is known. The predictive coding is realized with a sequence conversion unit to convert image data to prediction errors by predictive conversion, and an entropy coding unit to convert the prediction errors outputted from the sequence conversion unit to coded data with reduced redundancy by entropy coding such as Huffman coding.

As the characteristic of prediction-error occurrence frequency differs in accordance with the image, it is desirable to improve coding efficiency in order to perform optimum entropy coding on each image.

As a method for realizing optimum entropy coding on each image, 2-pass coding processing is known. In this method, the characteristic of prediction-error occurrence frequency is examined in the first pass, then an entropy coding method is determined based on the characteristics, and actual coding is performed in the second pass.

However, the above method is not frequently employed for various reasons such as the complexity of processing, the increment in memory capacity, and the load of code amount for separate transmission of information on entropy coding methods. Generally, the entropy coding method is determined in accordance with the characteristics of a general prediction error sequence.

In this case, the characteristic of prediction-error occurrence frequency is examined by previously encoding several images, and a coding method is determined based on the characteristics.

FIG. 6 shows an example of the above-described conventional image processing apparatus. In FIG. 6, reference numeral 201 denotes a buffer; 202, a predictor; 206, a subtracter; 204, a memory; 205, a Huffman encoder; and 111 and 112, signal lines. FIG. 2 shows an example of the image processing apparatus which employs predictive conversion using neighboring pixels for sequence conversion in order to convert image data to prediction errors, and employs Huffman coding as the coding processing.

In FIG. 2, prior to actual encoding, the prediction error frequency distribution, obtained by previously sequence-converting image data indicating several images, is examined, and a Huffman table is generated in correspondence with the prediction error frequency distribution, and the table is stored into the memory 204. As a general characteristic of prediction error frequency distribution, the occurrence frequency is high around a prediction error "0", and the occurrence frequency becomes gradually lower as the prediction error absolute value increases. Accordingly, in the Huffman code stored in the memory 204, a short code word is allocated around the prediction error "0", while a long code word is allocated to a high prediction error absolute value.

First, image data is sequentially inputted from the signal line 206. The buffer 201 holds the image data inputted from the signal line 206 by two lines. The predictor 202 reads image data of a pixel a immediately preceding a coding subject pixel and 1-line previous pixel b from the buffer 201, and performs calculation p=(a+b)/2, thereby generating a predicted value p.

The subtracter 203 outputs an error value e between image data x of coding subject pixel and the predicted value p. The Huffman encoder 205 refers to the Huffman table previously stored in the memory 204, and outputs coded data corresponding to the error value e from the signal line 207. Generally, the occurrence frequency of the prediction error e is high around the value "0" while it becomes lower as the value becomes away from "0". Accordingly, as shown in FIG. 8, a Huffman table where a short code word is allocated to prediction errors around "0", while a long code word is allocated to prediction errors away from "0", is employed.

When a natural image, especially, a picture image (obtained by reading a photograph with an image scanner or image sensing by a digital camera) is encoded, as adjacent pixels have approximately the same pixel value, the probability is high that the error between predicted value and real pixel value is "0" or nearly "0". Accordingly, the efficiency of compression coding is high. However, when image data having discrete pixel values such as a CG image or a limited color image is encoded by the above-described conventional image processing apparatus, the prediction-error occurrence frequency upon the above sequence conversion may be discrete.

In such case, a prediction error, which almost does not occur or does not occur at all, exists, even though a short code length is allocated by entropy encoding. Thus, the compressibility cannot be improved.

Regarding such problem, conventionally known are an entropy coding method of determining whether or not the prediction-error occurrence frequency is discrete, changing coded data corresponding to the prediction errors based on the result of determination (e.g., Japanese Patent Application Laid-Open No. Hei 10-004551), and a method of determining whether or not a coding subject image is constructed with discrete pixel values and correcting prediction values based on the result of determination (e.g., Japanese Patent Application Laid-Open No. Hei 10-004557). Note that both of above two references has been issued as U.S. Pat. No. 6,028,963.

These methods are used for obtaining effective improvement under constraints of 1-pass encoding. However, there is a need for further improvement in compression efficiency using 2-pass encoding.

SUMMARY OF THE INVENTION

The present invention has been made in consideration of the above problems, and provides a technique for easily and efficiently encoding image data having discrete pixel values such as a CG image or a limited color image as well as a natural image where pixel value changes are mild.

According to the present invention, the foregoing object is attained by providing an image coding apparatus for encoding multi-valued image data, comprising: block dividing means for dividing image data into blocks; determination means for determining, by block, whether or not occurrence distribution of pixel values, existing in the block along an axis of possible pixel value range, is discrete; conversion means for, by allocating continuous index values to the pixel values existing in the block, converting the pixel values in the block into index values; and predictive coding means for performing predictive coding one of the index values converted by the conversion means or the pixel values.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of flag array generated by the occurred level count unit;

FIG. 5 shows an example of index table;

FIG. 8 shows a Huffman table stored in a memory 204 in FIG. 6;

FIGS. 10A and 10B show the formats of tile header data;

FIG. 13 shows the format of a table stored in an index table memory 1204;

FIGS. 19A and 19B show the formats of tile header data according to the third embodiment;

DETAILED DESCRIPTION OF THE PREFERRED EMBODIMENTS

Preferred embodiments of the present invention will now be described in detail in accordance with the accompanying drawings.

First Embodiment

Figure 1:
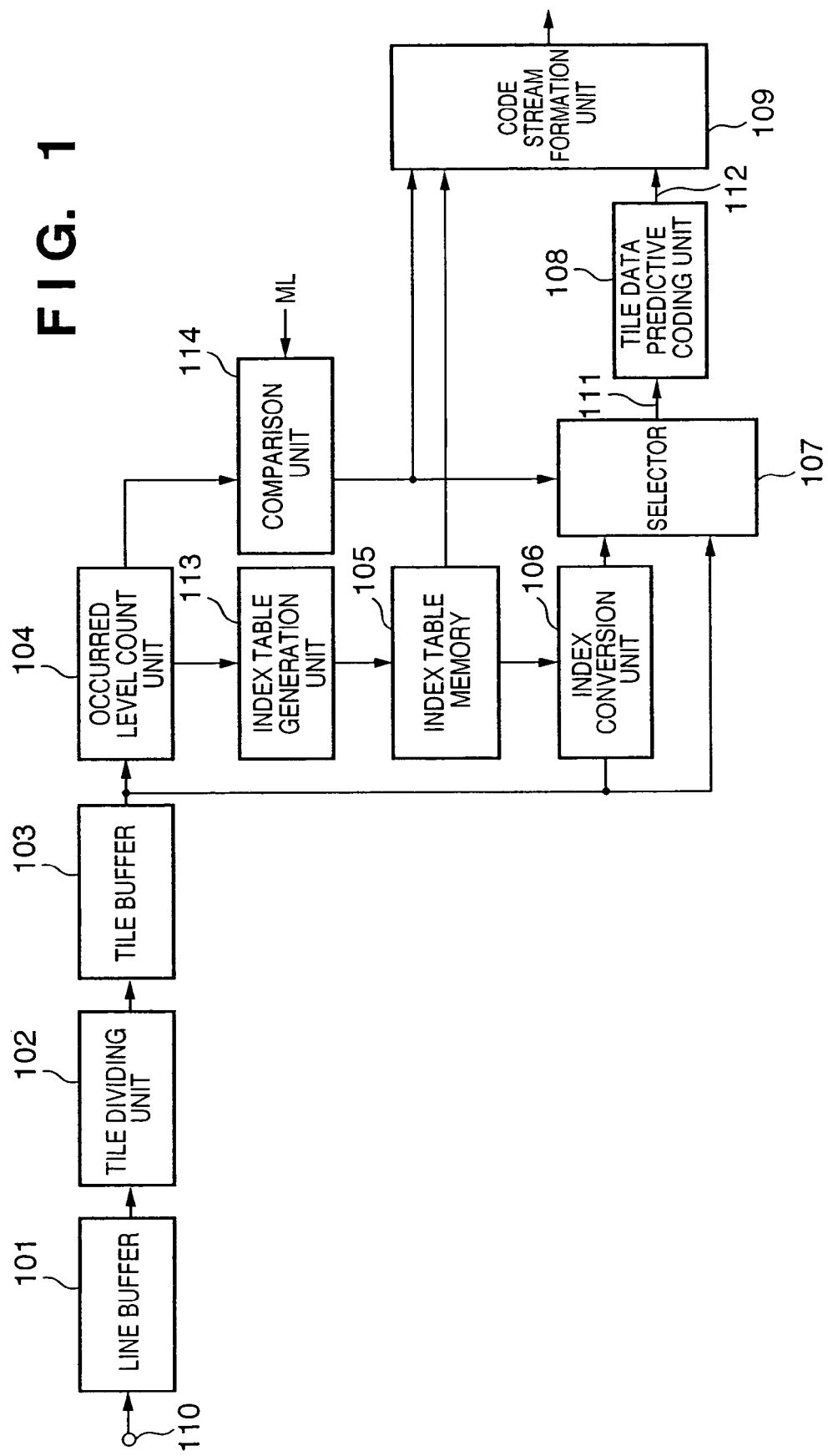
FIG. 1 is a block diagram showing the construction of an image coding apparatus according to a first embodiment of the present invention.

FIG. 1 is a block diagram showing the construction of an image processing apparatus (image coding apparatus) according to a first embodiment of the present invention.

In FIG. 1, reference numeral 110 denotes an input terminal to input image data. In the present embodiment, pixel data having respectively 8-bit (256 gray levels) R, G and B component brightness values is inputted by 1 line. The input image data is not limited to RGB color space data but data in other color space such as YMC, Lab or YCbCr may be inputted. Since it is well known for the persons skilled in the art that in the case of YMC space, each pixel is represented by YMC density values, those skilled art will easily understand the input data is not limited to the brightness values.

Numeral 101 denotes a line buffer which holds plural line color images. In the present embodiment, the number of lines stored in the line buffer 101 is Th. As 1 pixel corresponds to RGB three components and each component value (brightness value) is 8-bit data, assuming that the number of pixels of 1 line is W, the line buffer 101 has a capacity for W×Th×3 bytes. Note that as band-shaped images for Th lines are stored in the line buffer 101, the band image will be referred to as a "stripe" or "stripe image".

Numeral 102 denotes a tile dividing unit which divides the stripe image stored in the line buffer 101 by Tw pixels in a horizontal direction, to Tw×Th pixel-sized small areas. The divided one small area will be referred to as a "tile".

Numeral 103 denotes a tile buffer which holds 1 tile image. In the present embodiment, this partial image stored in the tile buffer 103 is handled as a unit of coding.

Note that in the present embodiment, assuming that the number of pixels of original image in the horizontal direction is W and that in the vertical direction (the number of lines) is H, W is an integral multiple of Tw and H, an integral multiple of Th. This assumption is made for the sake of simplicity of explanation. Those skilled in the art will easily understand from the following description that when W and H are not integral multiples of Tw and Th, similar processing can be performed on an incomplete sized tile in a right end or lower end portion of the image.

Returning to FIG. 1, numeral 104 denotes an occurred level count unit which counts the number of levels actually existing in a tile of interest (1 tile stored in the tile buffer 103) by each color component. In the present embodiment, each component corresponds to any of 8-bit i.e. 0 to 255 levels. In a case where regarding e.g. the R component, only "100" and "200" brightness values exist in one tile, the number of levels of the R component is "2".

Numeral 114 denotes a comparison unit which compares the number of levels outputted from the occurred level count unit 104 with a threshold value ML, and outputs the result of comparison.

Numeral 113 denotes an index table generation unit which allocates an index to each component value (brightness value in the present embodiment). Numeral 105 denotes an index table memory for storing an index table generated by the index table generation unit 113.

Numeral 106 denotes an index conversion unit which refers to the index table memory 105 and converts each color-component pixel value to an index.

Numeral 107 denotes a selector which selects one of the index from the index conversion unit 106 or the color-component brightness value from the tile buffer 103 in accordance with information outputted from the comparison unit 114. Numeral 108 denotes a tile data predictive coding unit which obtains an error between the value outputted from the selector 107 (index or brightness value) and a predicted value, thus performs coding.

Numeral 109 denotes a code stream formation unit which generates and outputs code stream data in a predetermined format based on the coded data from the tile data predictive coding unit 108, information indicating whether the coded data has been encoded based on the index or the brightness value, and index table information in the case of coding based on the index.

In the above construction, when image data for 1 tile has been stored in the tile buffer 103, first, coding is performed on the R component. In the R component coding processing, first, an R component index table is generated, then coding is performed while reading R component pixel values.

When the R component coding for 1 tile has been completed, similar processing is performed on the G component, and finally performed on the B component.

Note that it may be arranged such that three R, G and B index tables for 1 tile are generated, then the R component index table is selected and R component coding is performed, and then similar processing is performed on the G and B components. Further, the order of color components is not limited to this "R, G and B" order.

In this embodiment, regarding 1 color component in 1 tile, first, the brightness values of the color component are read from the tile buffer 103 and an index table is generated, thereafter, the brightness value is read again upon coding. That is, the coding processing in the present embodiment is 2-pass coding.

As described above, in the present embodiment, when color image data for 1 tile has been stored in the tile buffer 103, first, an R component index table is generated, then coding is performed while reading R component pixel values. As G and B components are similarly processed, the following description will be made mainly about the R component. That is, in G and B component coding, the expression "R component" is replaced with "G component" or "B component".

[Occurred Level Count Unit]

The occurred level count unit 104 obtains the number of R component brightness values NVL(R) occurred in 1 tile i.e. Tw×Th partial color image as follows (upon G component coding, the occurred level count unit 104 obtains NVL(G), and upon B component coding, obtains NLV(B)).

Figure 2:
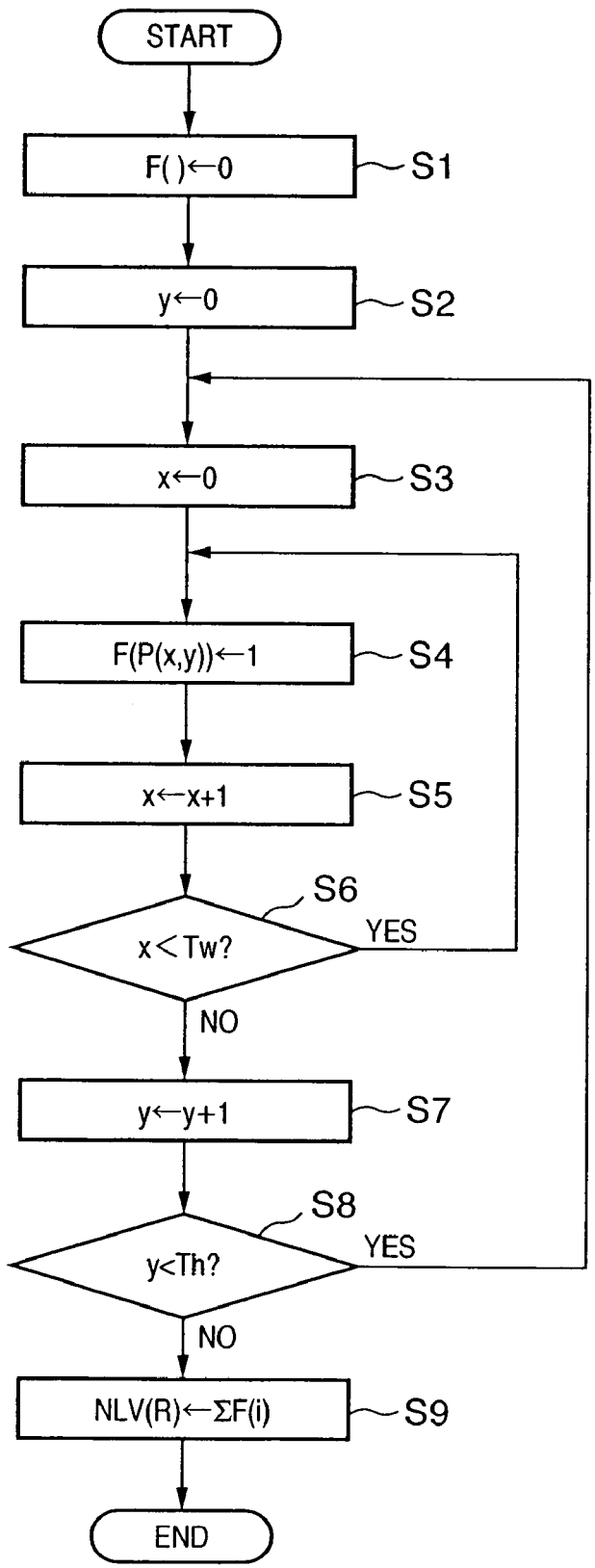
FIG. 2 is a flowchart showing processing by an occurred level count unit.

The processing procedure for obtaining the NLV(R) will be described with reference to the flowchart of FIG. 2.

In the present embodiment, as the R component has an 8-bit i.e. 0 to 255 level value, 256 array flags F(0) to F(255) corresponding to the respective brightness values are prepared. If an array flag $F(i)(0 \leq i \leq 255)$ has a value "1", an R component having brightness "i" exists, while if the array flag F(i) has a value "0", no R component having brightness "i" exists.

Further, in a tile of interest, a position in the horizontal direction is represented by a variable $x(0 \leq x \leq Tw-1)$, a position in the vertical direction is represented by a variable $y(0 \leq y \leq Th-1)$, and an R component brightness value in its coordinates (x, y) is represented as P(x, y). It is apparent that the value P(x, y) stands within the range from 0 to 255.

First, at step S1, the array variables F(0) to F(255) are set to an initial value "0". Then at step S2, the variable y is initialized to "0", then at step S3, the variable x is initialized to "0".

At step S4, the R component brightness value of the coordinates (x, y) in the tile buffer 103 is read as P(x, y), and "1" is stored in the array flag F(P(x, y)) having the read brightness value as an argument. For example, if P(x y)=100 holds, a brightness value "100" exists. Accordingly, "1" is stored in F(100).

Next, at step S5, the variable x is incremented by "1", and at step S6, it is determined whether or not the coordinates indicated by the variable x exist within the tile of interest. If x<Tw holds, the steps S4 to S5 are repeated, thereby the processing for 1 line in the tile is repeated.

If it is determined at step S6 that the processing for 1 line in the tile has been completed, the variable y is incremented by "1" for the processing on the next line. Then at step S7, the variable y is compared with the number of lines Th in the tile. As long as y<Th holds, as unprocessed line(s) remains, the processing at step S3 and the subsequent steps is repeated.

In the repetition of the above processing, in a case where R component having brightness value "i" exists in the tile at least once, the value of the flag F(i) becomes "1". On the other hand, regarding a brightness value j which does not exit, the value "0" of flag F(j), set in the initialization processing, remains the same.

Accordingly, at step S9, SF(i)(=F(0)+F(1)+ . . . +F(255)) is calculated, thereby the number of levels of the R component occurred in the tile of interest can be obtained.

In the above description, the processing is made for the R component, however, similar processing is made for the G and B components. In a case where the above processing is to be performed on the R, G and B components at once, the flag array F is represented as F(c, i). "c" corresponds to any one of the R, G and B components, and "i", a brightness value of each color component.

FIG. 3 shows an example of the flag array F(c, i) when the above processing is performed on the R, G and B components at once. As shown in FIG. 3, regarding the respective color components, an occurred brightness value is "1", and unoccurred brightness value is "0". NLV(c) means the total of the brightness values in each color component.

[Index Table Generation Unit]

The index table generation unit 113 generates index tables based on the numbers of occurred levels of the respective color components, NLV(R), NLV(G) and NLV(B), counted by the occurred level count unit 104, and stores the tables into the index table memory 105. Also, the processing mainly on the R component will be described.

The number of occurred levels NLV(R), and the flag values F(0) to F(255) are inputted from the above-described occurred level count unit 104. The processing in the index table generation unit 113 will be briefly described below.

In a case where R component brightness values in the tile of interest are "100", "120" and "130", F(100)=F(120)=F(130)=1 holds, and the values of other flags, F(0) to F(99), F(101) to F(199) and F(131) to F(255) are "0". At this time, NLV(R)=3 holds.

An index value "0" is allocated to the brightness level "100", an index value "1", to the brightness level "120", an index value "2", to the brightness level "130", and then no index value is allocated. Then a table showing the correspondence between the allocated index values and the brightness levels is stored into the index table memory 105.

Figure 4:
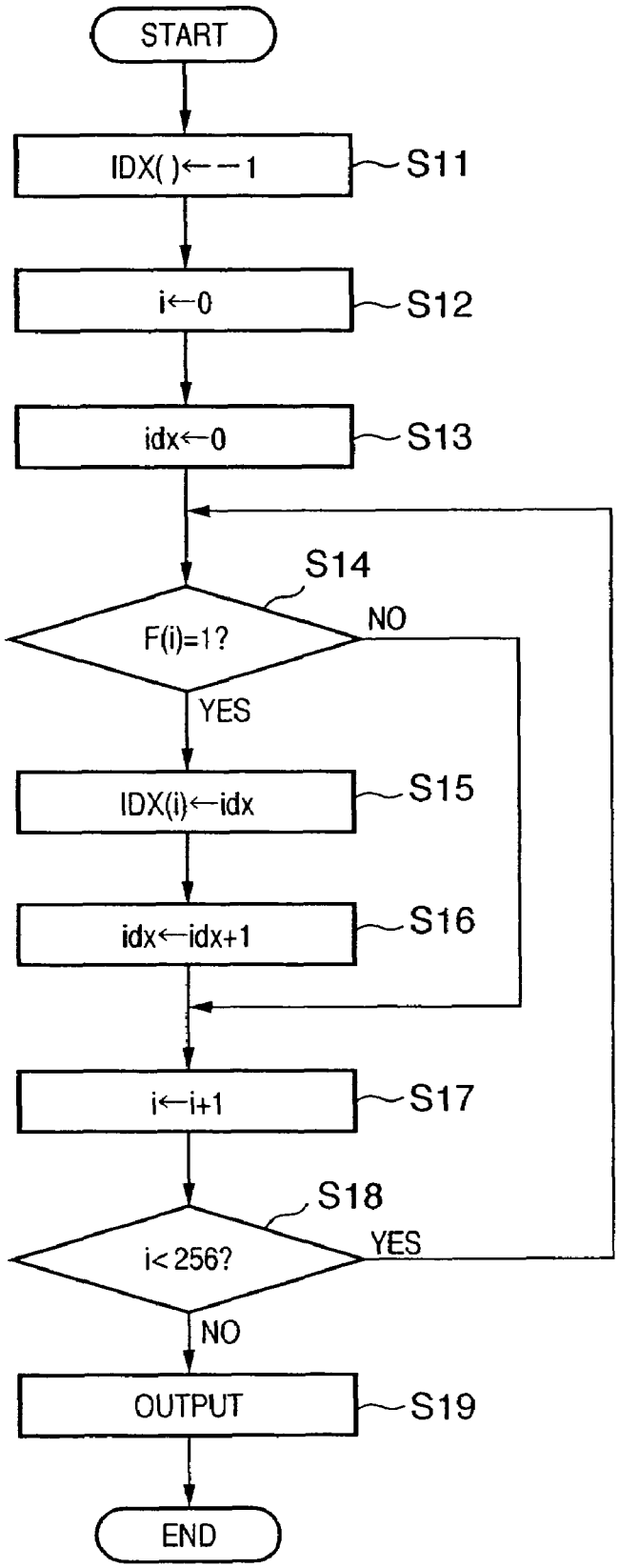
FIG. 4 is a flowchart showing processing by an index table generation unit.

The processing by the index table generation unit 113 is performed in accordance with, e.g., the flowchart of FIG. 4. Note that in the following description, an array variable IDX( ) is used for storage of an index value corresponding to each brightness value. A variable idx is used for storage of a latest index value to be allocated; and a variable i indicates a brightness value.

First, at step S11, "−1" is stored into the array variable IDX(0) to IDX(255). Since a normal index value is equal to or greater than "0", "−1" is set for distinction between this initial value and the normal index values. Next, at step S12, the variable i indicating a brightness value is initialized to "0", and at step S13, the variable idx is initialized to "0".

Next, at step S14, it is determined whether or not F(i)=1 holds, i.e., whether or not an R component brightness value i exists in the tile of interest. If it is determined that F(i)=0 holds, no R component brightness value i exists in the tile of interest. Accordingly, the index allocation processing (steps S15 and S16) is not performed, and the process proceeds to step S17 at which the variable i is incremented by "1".

On the other hand, if it is determined at step S14 that F(i)=1 holds, as an R component brightness value i exists in the tile of interest, the process proceeds to step S15, at which the value held in the variable idx is stored into the IDX(i), thereby an index is allocated to the brightness value i. Then at step S16, the variable idx is incremented by "1", then an index value to be allocated next is prepared, and at step S17, the variable i is incremented by "1".

At step S18, it is determined whether or not the value of the variable i is less than 256. If it is determined that the variable i=256 holds, as the execution/non-execution of index allocation processing has been completed, a table showing the correspondence between the array variables IDX(0) to IDX(255) and the brightness values is stored into the index table memory 105, and the table is outputted to the code stream formation unit 109.

In the above description, the processing is made for the R component, however, similar processing is made for the G and B components. In a case where the above processing is to be performed on the R, G and B components at once, the index array is represented as IDX(c, i). "c" corresponds to any one of the R, G and B components, and "i", a brightness value of each color component.

FIG. 5 shows an example of the index table memory 105 when the above processing is performed on the R, G and B components at once. In FIG. 5, in comparison with FIG. 3, an index equal to or greater than "0" is allocated to a brightness value occurred in the tile of interest, and an index "−1" is allocated to an unoccurred brightness value. Note that "−1" in the index table memory 105 is not referred to, since a brightness value i where "−1" is stored means that the brightness value does not exist in the tile of interest. Accordingly, it may be arranged such that only significant index values (values equal to or greater than "0" in the present embodiment) and corresponding brightness values are stored into the index table memory 105, and similar information is stored into the code stream formation unit 109.

[Coding Processing]

The processing by the occurred level count unit 104 and that by the index table generation unit 113 are performed in the first pass for the tile data of interest stored in the tile buffer 103. In the second pass, coding processing is performed. In the following description, coding processing on the R component will be described.

In the present embodiment, the coding processing has a brightness value coding mode for performing coding utilizing the R component brightness (8 bits) values stored in the tile buffer 103, and an index value coding mode for encoding index values 0, 1, 2 . . . converted from the R component values as described above, and one of these modes is selected by tile. That is, in the brightness value coding mode, the selector 107 outputs the R component brightness values read by raster scanning from the tile buffer 103. In the index value coding mode, the selector 107 outputs the index values converted by the index conversion unit 106 from the R component values read by raster scanning from the buffer 103. Assuming that an R component brightness value read by raster scanning from the tile buffer 103 is i, the index conversion unit 106 outputs an index value IDX(i) corresponding to the i value in the index table memory 105.

The criterion for selection of these coding mode, i.e., the selection criterion of the selector 107 will be described later. First, the tile data predictive coding unit 108 in the present embodiment will be described.

Figure 6:
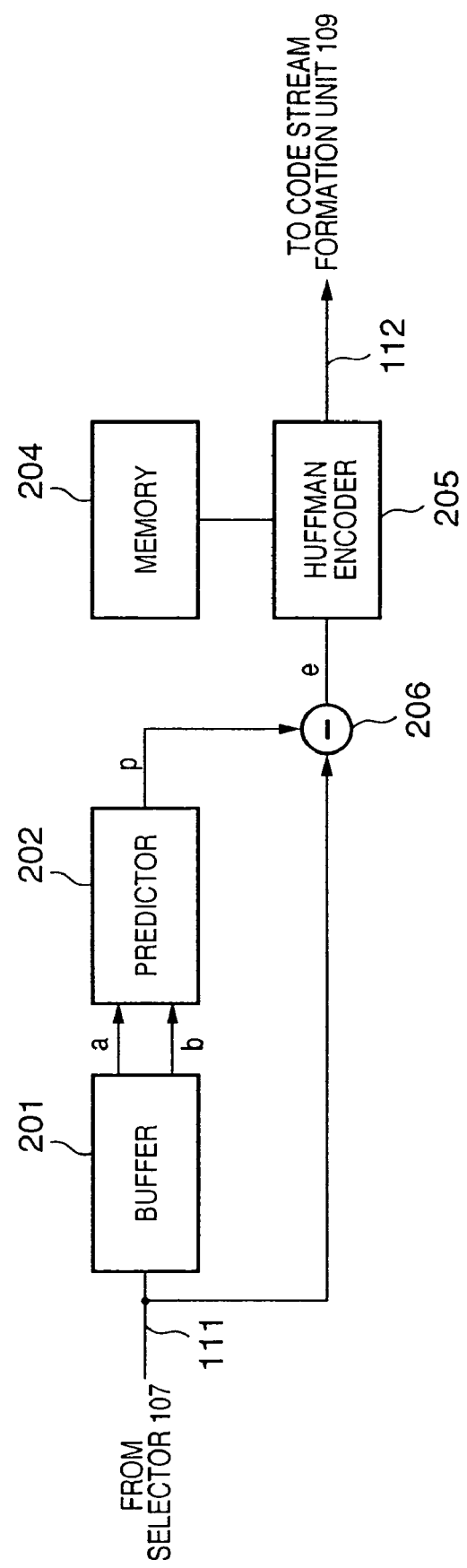
FIG. 6 is a block diagram showing the construction of a tile data predictive coding unit.

The tile data predictive coding unit 108 obtains a prediction value of a pixel of interest based on peripheral data of the position of the pixel of interest, calculates the error between the prediction value and actual data of the pixel of interest, and encodes the error. In the present embodiment, the tile data predictive coding unit 108 has a construction as shown in FIG. 6, however, any construction is applicable as long as it uses predictive coding of converting pixel data to prediction error and encoding the error, such as JPEG-LS (ISO/IEC14495-1 and 2) recommended as international lossless and semi-lossless compression standards for continuous-tone still images. Next, the coding of the R component will be described.

The buffer 201 holds R component brightness values or index values selected by the selector 107. As the input data, which is brightness value or index value, depending on the above-described mode, and which indicates information on the R component, will be referred to as "data" for the sake of simplicity of explanation, and an R component value or index value of a pixel of interest to be encoded will be referred to as "data of interest".

Figure 7:
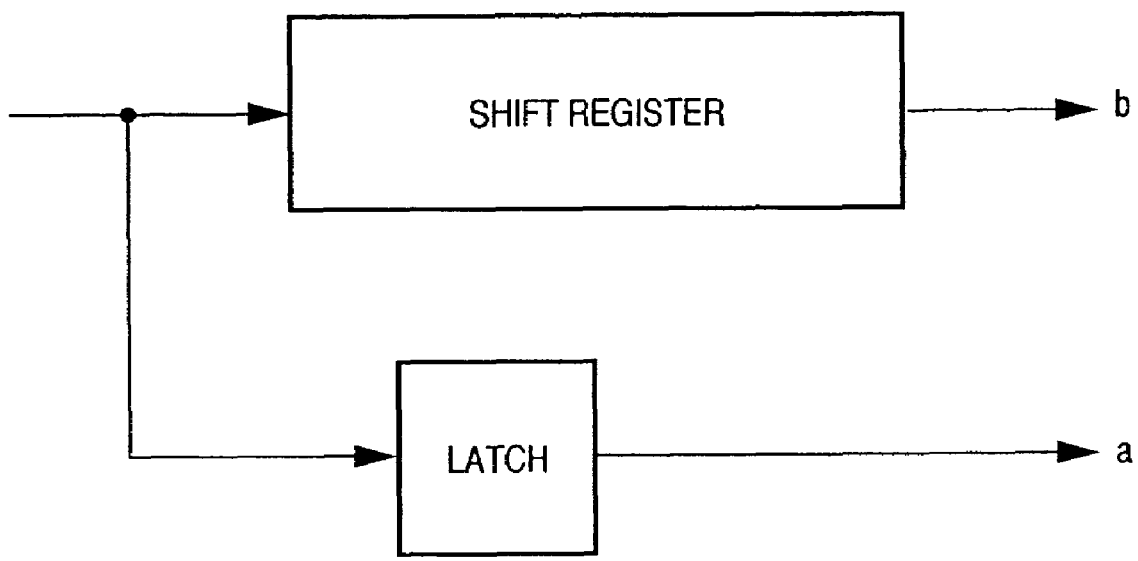
FIG. 7 is a block diagram showing an example of the construction of a buffer 201 in FIG. 6.

Assuming that the position of the data of interest in the tile is (x, y), the buffer 201 outputs data on 1-data previous position of the data of interest (x−1, y), as data a, and data on a 1-line previous position of the data of interest (x, y−1), as data b. The buffer 201 is realized with, e.g., the construction as shown in FIG. 7 having a shift register to store Tw data and a latch (or register) for 1-data delay. As the shift register holds Tw data, it outputs data b which is 1-line previous of the data of interest inputted from the selector 107. On the other hand, the latch outputs the data a which is 1-data previous of the data of interest. The data a and b are peripheral data of the data of interest, and these data have already been subjected to coding processing.

The predictor 202 calculates a mean value between the peripheral data a and b of the data of interest, and outputs the result of calculation as predicted data p. The subtracter 206 subtracts the data of interest from the predicted value p and outputs the result of subtraction. The Huffman encoder 205 refers to a Huffman table (e.g., in FIG. 8) stored in the memory 204 and replaces the error value with a code word and outputs coded data.

Note that the construction shown in FIG. 6 itself is a general construction, and more detailed description will be omitted. Further, FIG. 6 merely shows an example in the present embodiment.

The characteristic feature of the embodiment is that the data inputted into the construction in FIG. 6 is R component brightness values or index values, and mixing of brightness values and index values as data to be encoded is avoided in coding of 1 component in 1 tile.

Next, the principle of generating a selection control signal from the selector 107 in the present embodiment, i.e., the condition for selection between the brightness value coding mode and the index coding mode will be described.

As described above, in the first pass, the occurred level count unit 104 extracts the number of occurred levels NLV(R) indicating the number of types of R component values in the Tw×Th sized tile of interest.

If the NLV(R) is a small value, there is a high probability that the existing brightness values are discrete. More particularly, when the subtracter 206 calculates the difference between an R component brightness value and predicted value of pixel of interest, it is likely that the distribution of the error value is discrete and is a large absolute value. As shown in FIG. 8, when a short code is allocated to a near "0" error value, while a longer code is allocated to an error value as it is away from "0", as a many-bit code is generated, the coding efficiency is lowered.

In this embodiment, the index values 0, 1, 2 . . . are substantially unrelated to actual brightness values, and the error value, calculated by predictive coding using the index value, to the maximum, is the difference between a maximum index value and a minimum index value. Further, as the NLV(R) having a small value means that the maximum index value is a comparatively small value, the coding efficiency is higher than that in the predictive coding using the brightness value. It should be noted that in the coding using the index value, as decoding cannot be performed without index table, the data amount is increased by the capacity of the index table.

On the other hand, when the NLV(R) is a large value, the number of existing brightness values (the number of occurred levels in the present embodiment) in the limited range from 0 to 255 is large. Accordingly, even when brightness values are selected upon coding, there is a high probability that the error value obtained in the computation of predictive coding is a small value. Further, as the coding is performed based on brightness value, the index table is not necessary.

As described above, the coding utilizing R component brightness values or the coding utilizing index values is determined based on the NLV(R) indicating the types of R component values in 1 tile. Accordingly, as shown in FIG. 1, the comparator 114 compares the NLV(R) outputted from the occurred level count unit 104 with a predetermined threshold value ML. If NLV(R)≧ML holds, the comparator 114 outputs a signal to select the brightness value coding mode, while if NLV(R)<ML holds, the comparator 114 outputs a signal to select the index value coding mode.

Note that in the above description, the processing is performed on the R component, however, similar processing is performed on the G and B components. It is desirable that the threshold value ML is, in consideration of the number of bits indicating the possible range of index value, a value represented by the power of 2 such as 16, 32, 64 or 128. Further, it is desirable that the threshold value ML is proportional to the value of the tile size Tw×Th. However, these values are merely desirable examples but do not limit the present invention.

Next, the code stream formation unit 109 of the present embodiment will be described.

The code stream formation unit 109 inputs the R component coded data, the G component coded data and B component coded data for 1 tile, from the tile data predictive coding unit 108.

Note that it is necessary to determine whether the input respective color-component coded data have been encoded by the predictive coding using brightness values or by the coding using index values. Further, there is a probability that in 1 tile, the R and G component coded data may be the results of the coding using brightness values while the B component coded data may be the result of the coding using index values. As the selected coding mode is determined by the output signal from the comparator 114, the output signal from the comparator 114 is outputted to the code stream formation unit 109.

Further, upon decoding processing on data encoded in the index value coding mode, conversion from index value to brightness value is necessary. Accordingly, the data in the index table memory 105 is also outputted to the code stream formation unit 109.

The code stream formation unit 109 generates coded data having an appropriate header based on these data. Next, an example of the format of coded data will be described.

Figure 9:
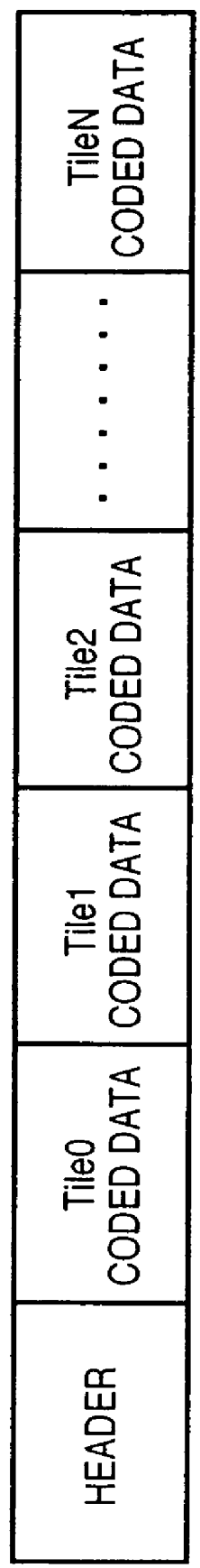
FIG. 9 shows the format of coded data generated by the image coding apparatus according to the first embodiment.

FIG. 9 shows the format of coded data in the present embodiment. The coded data has a stream header holding information on the size of original image, the number of tiles and the like, at its head. Following the stream header, the coded data in the respective tiles are sequentially held.

As described above, as 1 tile coded data includes R, G and B coded data, it is necessary to determine for each component whether the coded data has been obtained by the coding using brightness values or by the coding using index values. Accordingly, the header of coded data in each tile (hereinbelow, "tile header") includes 3-bit information where information indicating the type of the R, G and B coded data are allocated to bit 2, bit 1 and bit 0 of the 3 bits. If the bit value is "0", the data has been encoded by the coding using brightness values, while if the bit value is "1", the data has been encoded by the coding using index values. More specifically, NLV(R)<ML, NLV(G)<ML and NLV(B)<ML are reflected in the bit 2, the bit 1 and the bit 0 of the tile header, and regarding each component, if the condition is satisfied, "1" is set, while the condition is not satisfied, "0" is set.

Note that the tile header may include other information than the above information, however, in the present embodiment, the tile header includes only the 3 bit information. Accordingly, the value stored in the tile header is within the range from 0 to 7.

FIGS. 10A and 10B show the formats of the tile header data.

In FIG. 10A, as the value of the tile header is 0, it can be understood that all the color-component coded data have been obtained by the coding using brightness values.

On the other hand, in FIG. 10B, as the value of the tile header is 1 to 7, it can be understood that at least one of the color component coded data have been obtained by the coding using index values. Further, as the coded data obtained by the coding using index values is included, conversion table information (information stored in the index table memory 105, e.g., the data in FIG. 5) is included in the tile data as shown in FIG. 10B. In the "index conversion table information", color component conversion table(s) corresponding to bit(s) having the value "1" among the bit 2, the bit 1 and the bit 0 of the 3 bit information, are sequentially stored in the order of the bit position.

The "index conversion table" in the coded data stream is generated as follows.

Assuming that in a time of interest, all the R component brightness values, 0, 1, 2, . . . 255, have occurred, three G component brightness values, 0, 128 and 255 have occurred, and five B component brightness values, 0, 50, 100, 128 and 192 have occurred, NLV(R)=255, NLV(G)=3 and NLV(B)=5 hold. Next, a case where the threshold value ML=32 holds will be described.

At this time, as the R component number of occurred levels NLV(R)(=255) is greater than the threshold value ML(=32), the coding using index values is not performed. Accordingly, no information of is included in the "index conversion table information". That is, the bit information of the bit 2, the bit 1 and the bit 0 of the tile header are "0", "1" and "1", and the value of the tile header is "3".

On the other hand, as the G component and B component numbers of occurred levels NLV(G) and NLV(B) are less than the threshold value ML, the occurred brightness values are outputted sequentially from low brightness to high brightness. Note that "0" is inserted as a delimiter between the respective color component data.

In the above case, the values stored in the "index conversion table" in the coded data stream are 0, 128, 255, 0, 0, 50, 100, 128, 192 and 0.

On the decoding side (to be described later), as the value of the bit 2 of the tile header 3-bit data is "0" and the values of the bit 1 and the bit 0 are "1", it can be determined that the "index conversion table" in the received coded data stream has no R component brightness value but G and B component brightness values.

Accordingly, the fourth data "0" and the tenth data "0" are determined as delimiters, and G component brightness values 0, 128 and 255

B component brightness values 0, 50, 100, 128 and 192 are obtained.

In the present embodiment, as "0" is allocated as an index initial value from low brightness value to high brightness value, as the combination of (index value, brightness value), A G-component inverse index conversion table holding (0, 0), (1, 128) and (2, 255) can be generated.

Further, a B-component inverse index conversion table holding (0, 0), (1, 50), (2, 100), (3, 128) and (4, 192) can be generated.

Figure 11:
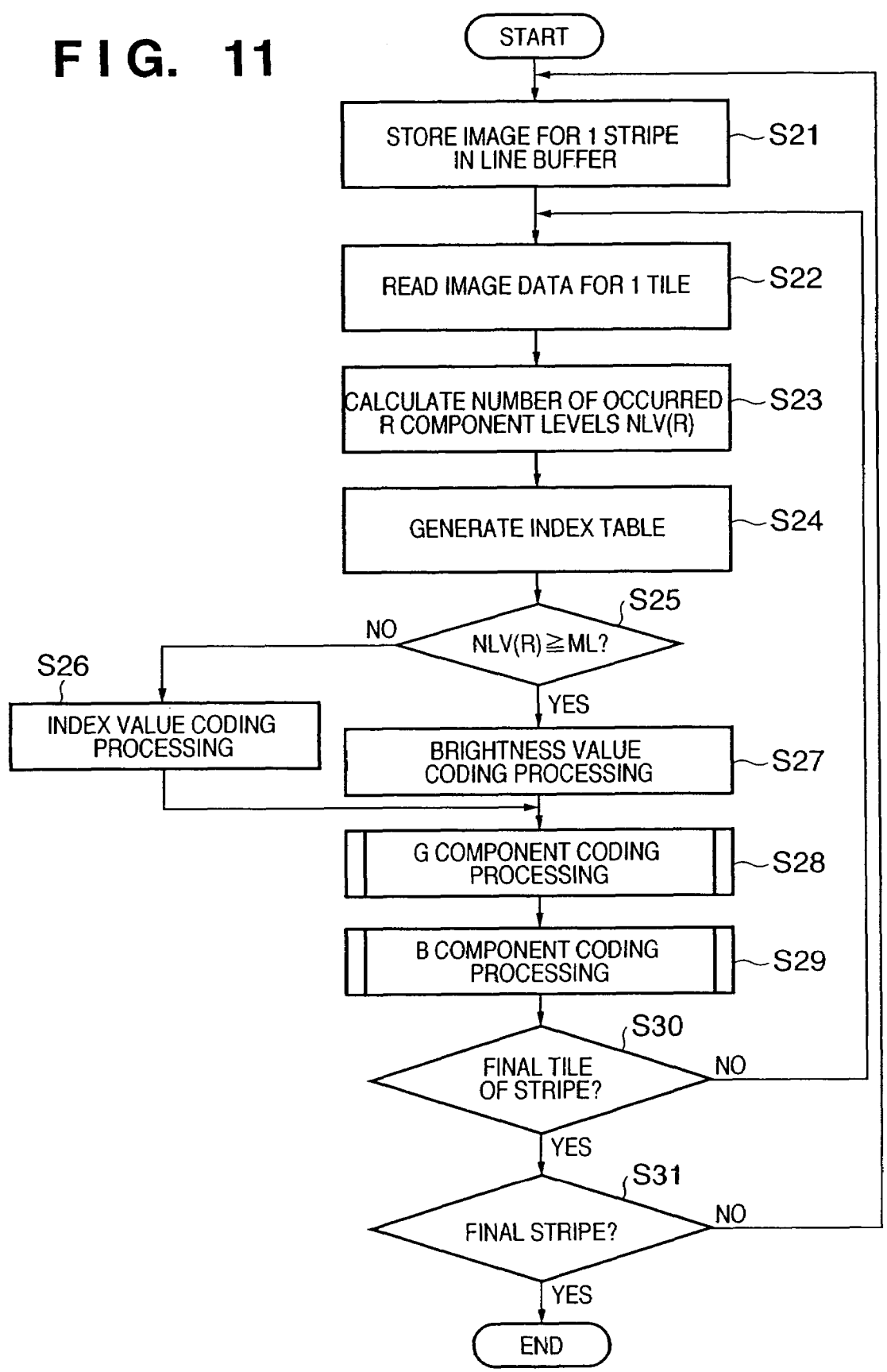
FIG. 11 is a flowchart showing the entire processing procedure in the image coding apparatus according to the first embodiment.

The entire processing procedure in the image coding apparatus of the present embodiment as described above is as shown in the flowchart of FIG. 11. Next, the processing procedure will be described in accordance with the flowchart.

First, at step S21, image data for 1 stripe (W×Th sized image data) from an original image as the subject of coding is stored into the line buffer 101 (see FIG. 1). Next, at step S22, image data for 1 tile (Tw×Th sized image data) is read from the line buffer 101, and is stored into the tile buffer 103.

At step S23, regarding the R component in the image data stored in the tile buffer 103, the number of occurred levels NLV(R) indicating the number of R component brightness values and the flag array F(i)(i=0, 1, . . . 255) are calculated. At step S24, the index table IDX(i) is generated based on these information, and the table is stored into the index table memory 105.

Next, the process proceeds to step S25, at which it is determined whether or not the relation between the number of occurred R component levels NLV(R) and the threshold value ML satisfies NLV(R)≧ML.

If it is determined that the NLV(R)≧ML holds, it is determined that the R component in the tile of interest is not discrete, and the coding using brightness values is performed for the R component in the tile of interest (step S27). Further, if NLV(R)<ML holds, it is determined that the R component in the tile of interest is discrete, and the R component values are converted to index values and coding is performed on the result of conversion (step S26).

As described above, the coding is performed on the R component in the tile of interest. At step S28, coding processing is performed on the G component, and at step S29, coding processing is performed on the B component. The coding processings at steps S28 and S29 are the same as the coding processing at steps S23 to S27 except that the component as the subject of processing is different.

At step S30, it is determined whether or not the tile of interest has been the final tile stored in the line buffer 101. If NO, the process returns to step S22 so as to perform processing on the next tile. If it is determined that the tile of interest has been the final tile stored in the line buffer 101, it is determined whether or not the processing has been performed on the final stripe at step S31. If NO, the process returns to step S21 to repeat the processing at step S21 and the subsequent steps.

<Decoding Apparatus>

Figure 12:
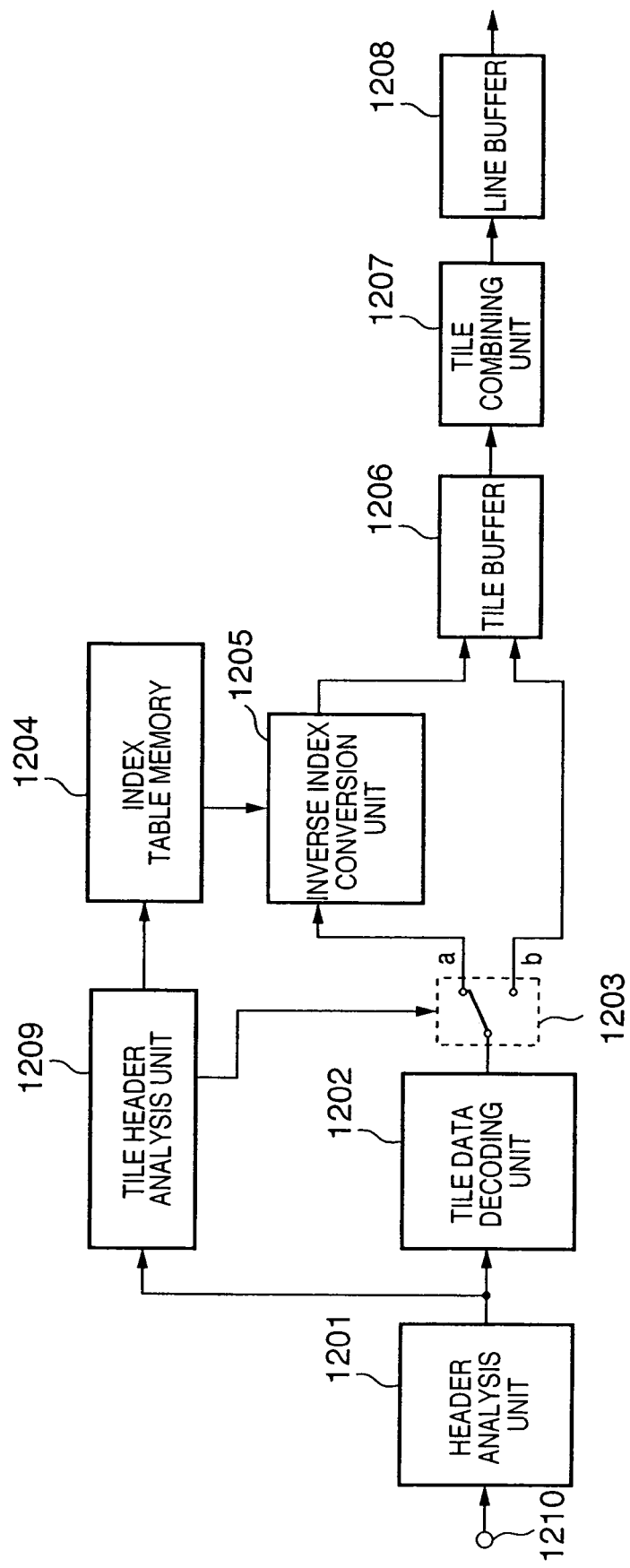
FIG. 12 is a block diagram showing the construction of a decoding apparatus according to the first embodiment.

Next, the operation of a decoding apparatus according to the present embodiment, having a construction as shown in FIG. 12, will be described below.

Generally, as decoding processing is inextricably linked with coding processing, it can be considered that the decoding processing has already been explained in the explanation of the coding processing. However, the arrangement and operation of the decoding processing will be briefly described. FIG. 12 is a block diagram showing the construction of the decoding apparatus according to the first embodiment.

In the decoding apparatus, a code stream in the format as shown in FIG. 9 is inputted, by tile coded data, from an input terminal 1210.

In the input tile data, the tile header and the index conversion table information (if exists) are supplied to a tile header analysis unit 1209. The respective component coded data are supplied to a tile data decoding unit 1202.

When the 3-bit value of the input tile header is "0", the tile header analysis unit 1209 turns a switch 1203 to the output terminal b side until the decoding for all the color components for 1 tile has been completed, so as to exclude an inverse index conversion unit 1205.

Accordingly, the tile data decoding unit 1202 stores the result of decoding of the R and G and B coded data following the tile header directly into a tile buffer 1206. When the decoding for all the color components in 1 tile has been completed, a tile combining unit 1207 outputs the decoded data to a line buffer 1208. The processings by tile buffer 1206, the tile combining unit 1207 and the line buffer 1208 is the inverse of the processings by the line buffer 101, the tile dividing unit 102 and the tile buffer 103 in FIG. 1.

On the other hand, when the 3 bits of the input tile header includes at least one bit having the value "1", the following processing is performed.

As the tile data decoding unit 1202 sequentially perform decoding on the R, G and B components, it is determined, in synchronization with the decoding, whether or not the bit 2, the bit 1 and the bit 0 of the 3 bits of the tile header are "1". When one bit is "1", the switch 1203 is turned to the output terminal a side, and an index table for the corresponding color component is generated and stored into an index table memory 1204. Regarding a bit having the value "0", as the corresponding color component coded data has been encoded using not index values but brightness values, the switch 1203 is turned to the output terminal b side.

The format of the data stored in the index table memory 1204 is as shown in FIG. 13. That is, as input value→brightness value conversion is performed, actual RGB component brightness values for the index values are stored.

The inverse index conversion unit 1205 converts the index values stored in the index table memory 1204, as decoded value, into brightness values, and outputs the result of conversion to the tile buffer 1206.

Next, the decoding processing will be described with reference to FIG. 14 which is a flowchart showing a processing procedure of the entire decoding processing. Note that the description will be made based on the presumption that the header of coded data stream has information indicating that several tiles exist in the horizontal direction, and the image has several stripes.

First, at step S41, coded data for 1 tile is inputted.

At step S42, it is determined whether the value of the bit 2 of the tile header is "1" or "0", i.e., whether or not NLV(R) ML≧holds. If it is determined that the value of the bit 2 is "0", as the R component in the tile of interest has been encoded based on brightness values, the switch 1203 is turned to the "b" side at step S46, and decoding processing is performed at step S47. As a result of decoding, R component brightness values in the tile of interest are stored into the tile buffer 1206.

On the other hand, if it is determined at step S42 that the value of the bit 2 of the tile header is "1", as the R component in the tile of interest has been encoded based on index values, the switch 1203 is turned to the "a" side at step S43, and an index value→brightness value conversion table is generated and stored into the index table memory 1204. At step S44, decoding to index values is performed. Then at step S45, the index values are converted to brightness values and stored into the tile buffer 1206.

At steps S48 and S49, G component decoding processing and B component decoding processing are performed. These processings are the same as the decoding processing at steps S42 to S47. The difference is that in the determination in the G component decoding processing corresponding to step S42, the state of the bit 1 of the tile header is determined, and in the determination in the B component decoding processing, the state of the bit 0 of the tile header is determined.

When the processing at step S49 has been completed, as all the color components in the tile of interest have been stored in the tile buffer 1206, then at step S50, the R, G and B brightness data are read from the tile buffer 1206 such that 1 pixel has "R, G and B" format data, and stored into a corresponding tile position in the line buffer 1208.

At step S51, it is determined whether or not the final tile of the stripe has been completed. If NO, the process returns to step S41 to repeat the processing at step S41 and the subsequent steps.

Further, if it is determined that a decoded image for 1 stripe has been stored in the line buffer 1208, the image data for 1 stripe is outputted from the line buffer 1208 at step S52. Then, the above processing is repeated until it is determined at step S53 that the image output of the final stripe has been completed.

As described above, according to the present embodiment, image data is divided into plural small block areas (tiles in the embodiment, and in each small area, the number of occurred levels of each color component is counted. When the number of occurred levels is equal to or less than a predetermined value, the brightness values are converted to index values, and subjected to predictive coding. In this processing, regarding image data having discrete frequency distribution such as a CG image, brightness values are replaced with index values, thereby coding is performed on seemingly clustered frequency distribution. Thus the coding efficiency can be improved. Further, as this processing is applied only when the number of occurred levels is equal to or less than the predetermined value, the increase in code amount due to addition of index conversion table can be suppressed, and harmful effect on coding of natural image without extremely biased frequency distribution can be avoided.

Regarding natural images obtained by a digital camera and the like, the coding efficiency as in the past can be maintained.

<Modification>

In the above embodiment, the coding apparatus has the construction as shown in FIG. 1 and the decoding apparatus, the construction as shown in FIG. 12, however, these apparatuses may be realized by computer programs. In such case, the line buffer and the tile buffer in FIG. 1 may be constructed with array variables ensured in a RAM, and the respective processing units including the tile dividing unit 102 and the occurred level count unit 104 may be realized as subroutines and function programs to perform corresponding processings. The decoding apparatus may be similarly realized by a computer program.

Figure 15:
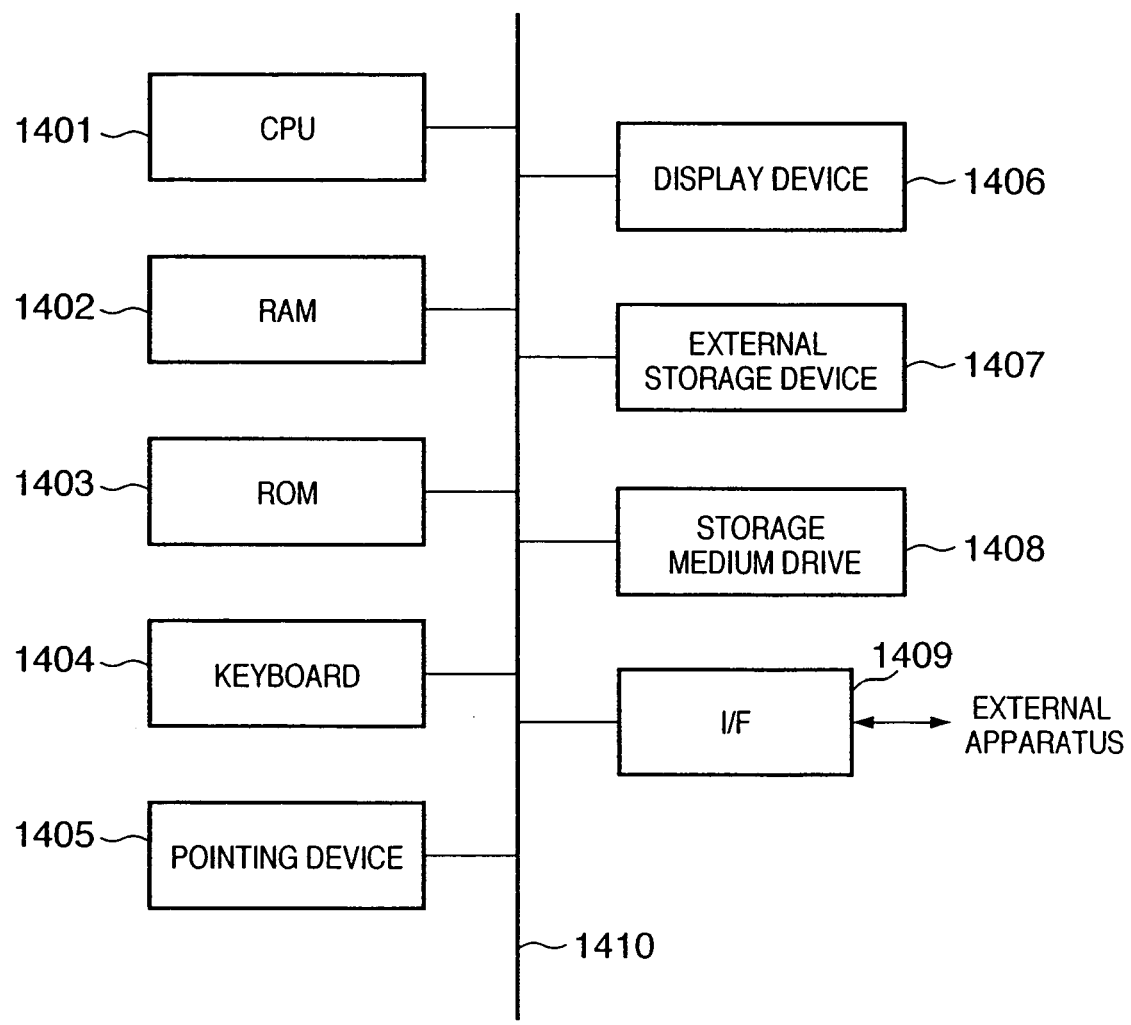
FIG. 15 is a block diagram showing the apparatus construction in a case where the functions of the first embodiment are realized by a computer program.

In the above case, the apparatus has a construction as shown in FIG. 15. FIG. 15 is a block diagram also showing the construction of a general information processing apparatus such as a personal computer. In FIG. 15, numeral 1401 denotes a CPU which controls the entire apparatus; 1402, a RAM used as a work area for the CPU 1401; 1403, a ROM for storing a boot program and BIOS; 1404, a keyboard; 1405, a pointing device such as a mouse (registered trademark); 1406, a display device; 1407, an external storage device such as a hard disk in which an OS, image coding and decoding application programs (corresponding to FIGS. 1 and 12 described in the above embodiment), various types of image files and the like are stored; 1408, a storage medium drive for access to a computer-readable storage medium such as a CD-ROM; and 1409, an interface for communication with an external apparatus, such as a network interface, an SCSI interface or a USB interface.

The images to be encoded by the apparatus include an image file generated by the application program and stored in the external storage device, an image file stored in the storage medium set in the storage medium drive 1408, and an image file received via the interface 1409. Further, the images to be decoded may be similarly obtained as above.

Note that since the computer program is generally stored in a computer-readable storage medium such as a CD-ROM and becomes executable when the storage medium is set in the storage medium drive 1408 and duplicated or installed into the system, it is apparent that the present invention includes such computer-readable storage medium in its scope.

Second Embodiment

In the first embodiment and the modification, the degree of discrete distribution (sparseness) of respective color-component brightness values occurred in 1 tile is represented by the respective color-component number of occurred levels NLV (R), NLV(G) and NLV(B). That is, when the number of brightness types occurred in a limited brightness range (0 to 255 as 8-bit data) is small, there is a high probability that the brightness distribution is discrete to the brightness axis, in other words, sparse. However, the relation "number of occurred levels is small=degree of discrete distribution is high" does not necessarily hold.

Figure 16A:
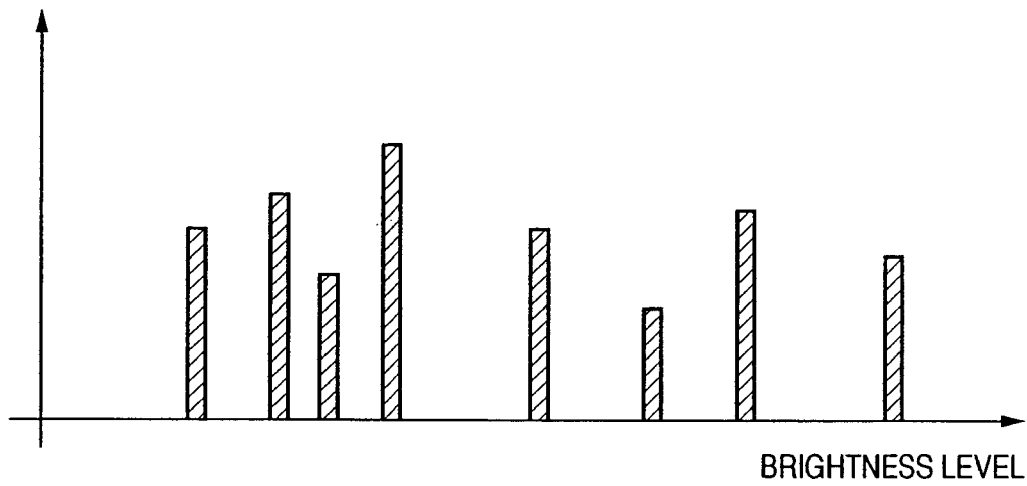
FIGS. 16A and 16B are graphs showing examples of brightness value level distribution for explaining a problem in a second embodiment of the present invention.
Figure 16B:
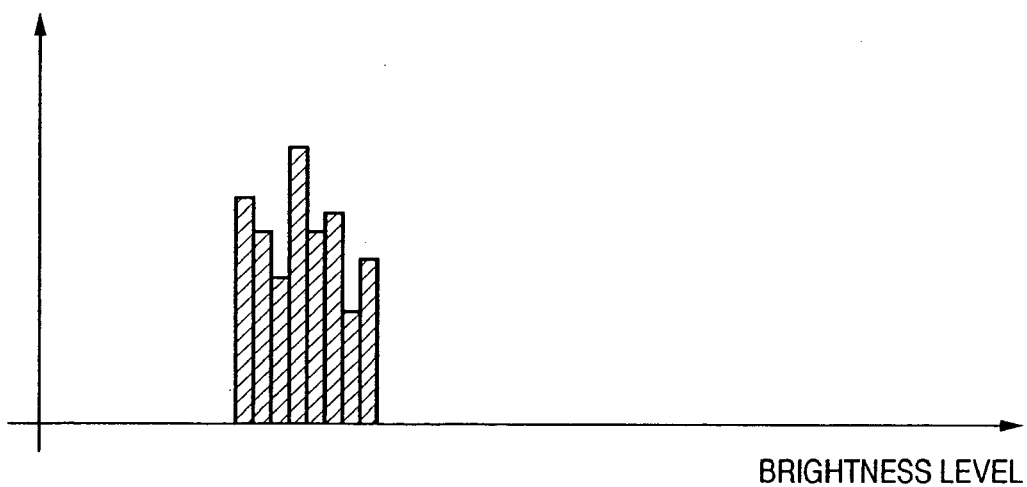

FIGS. 16A and 16B are histograms showing brightness on the horizontal axis and occurrence frequency on the vertical axis in a case where the number of occurred levels NLV( )=8 holds. FIG. 16A shows an example where the occurred brightness values are appropriately discrete, and FIG. 16B, an example where the occurred brightness values are clustered to the brightness axis.

Assuming that the threshold value ML described in the first embodiment is "32", the coding using index is performed in both cases in FIGS. 16A and 16B. In the case of FIG. 16A, as continuous integral index values are allocated to the occurred brightness values, the errors calculated in the predictive coding are small, and high coding efficiency can be expected.

However, in FIG. 16B where the occurred brightness distribution is clustered to the brightness axis, there is no large difference in "data amount obtained by predictive coding processing" between the predictive coding using brightness values and the predictive coding using index values. Rather, in the coding using index values, the coding efficiency is degraded due to addition of "data for generation of index conversion table" to the code stream.

Accordingly, in the second embodiment, the above problem is solved by obtaining the "degree of discrete distribution" with higher accuracy.

Even when the number of occurred levels NLV( )=8 holds in FIGS. 16A and 16B, the cases of these figures can be distinguished from each other.

In the present embodiment, for the sake of simplicity of computation processing, maximum brightness Max(c) and minimum brightness Min(c) of a color component c (c is any one of R, G and B components) in one tile are detected, and the distance "Max(c)−Min(c)" is compared with a threshold value RT, as an additional condition.

That is, if the following two conditions are satisfied, $$NLV(c) < ML \quad (1)$$

and $$Max(c) - Min(c) > RT \quad (2),$$

it is determined that the color component of interest c is discrete. Then the predictive coding using the result of conversion to index values is performed. If at least one of the above two conditions is not satisfied, the predictive coding using brightness value is performed.

Figure 17:
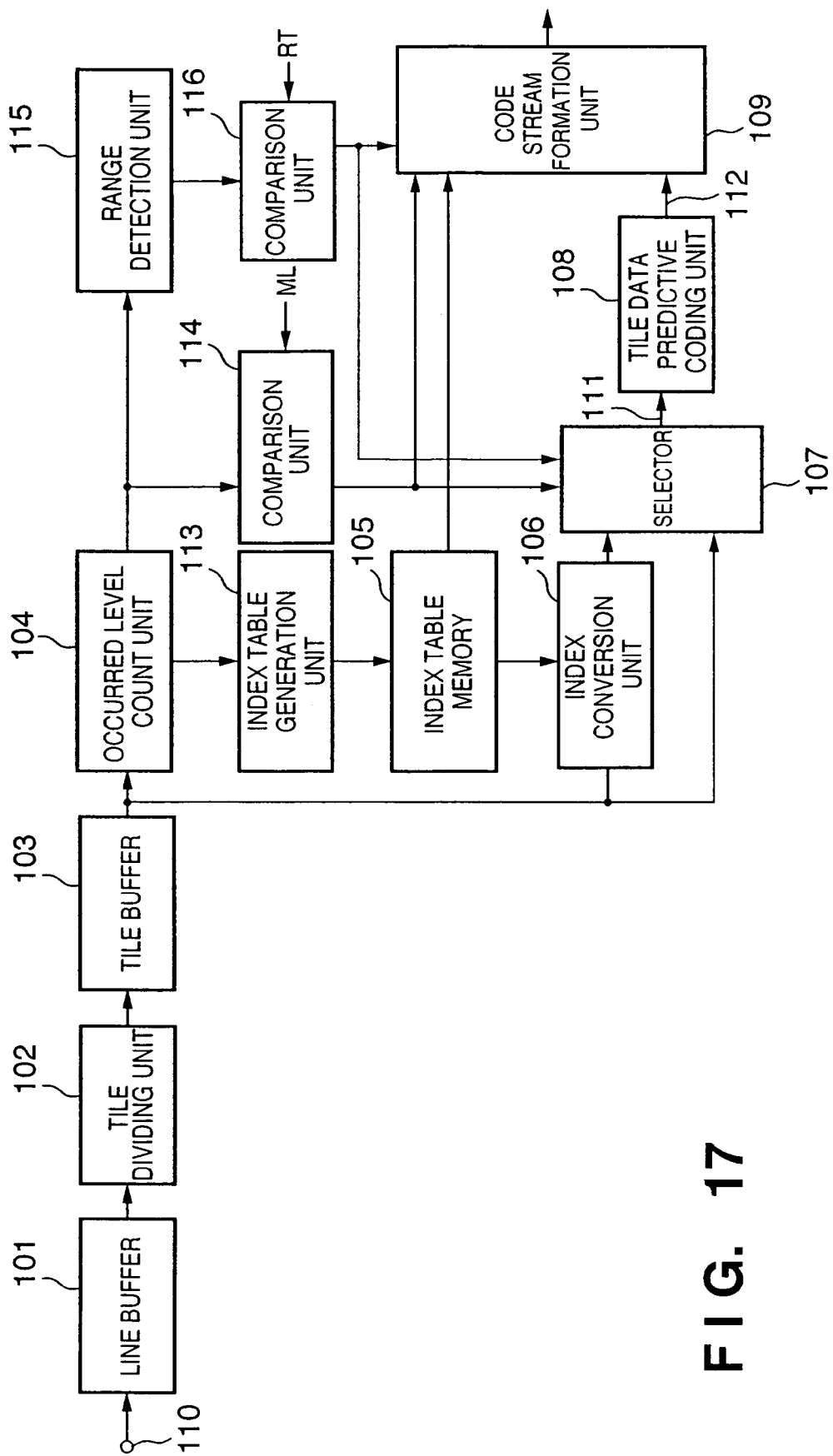
FIG. 17 is a block diagram showing the construction of the image coding apparatus according to the second embodiment.

To realize the above processing, the construction of the coding apparatus shown in FIG. 1 is replaced with a construction as shown in FIG. 17. In FIG. 17, the difference from FIG. 1 is that a range detection unit 115 and a comparison unit 116 are added.

The range detection unit 115 inputs the flag array F(i) outputted from the occurred level count unit 104, detects a maximum brightness value imax and a minimum brightness value imin of "1" brightness, and calculates a value indicating the range of existing brightness (=imax-imin). The comparison unit 116 compares the range value with the threshold value RT, and outputs the result of comparison, as the result of determination in the conditional expression (2), to the code stream formation unit 109 and the selector 107.

When signals indicating that the conditional expressions (1) and (2) are satisfied are received from the comparison unit 114 and the comparison unit 116, the selector 107 selects the index values from the index conversion unit 105, otherwise, selects the brightness values from the tile buffer 103. Further, the code stream formation unit 109 performs similar determination to that by the selector 107, and reflects the result of determination in the 3 bits of the tile header of code stream.

Figure 14:
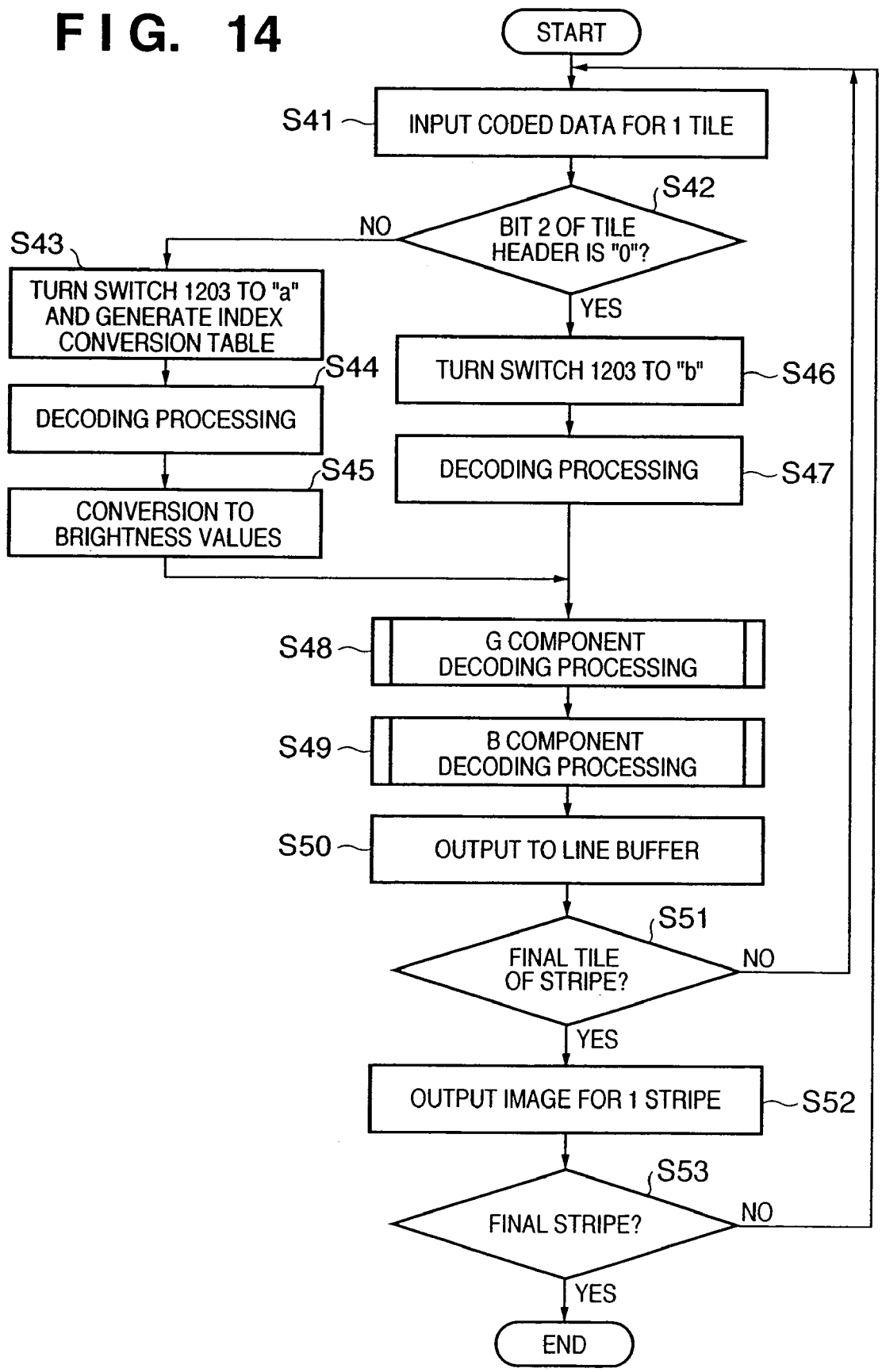
FIG. 14 is a flowchart showing a processing procedure in the decoding apparatus according to the first embodiment.

Accordingly, the decoding processing according to the second embodiment is the same as the decoding processing in the first embodiment (FIG. 14).

As described above, according to the second embodiment, as the degree of discrete distribution of brightness values within 1 tile is determined with higher accuracy, the compression coding efficiency can be further increased.

Note that it is apparent that the second embodiment is applicable to a computer program and a computer-readable storage medium as in the case of the first embodiment.

Third Embodiment

In the first embodiment, the modification and the second embodiment, all the tiles are subjected to lossless coding. However, the present invention is not limited to this coding but applicable to a combination of lossless coding and lossy coding for the sake of improvement of compressibility. As a third embodiment, an example of image processing apparatus which encodes tile data by lossless and lossy coding methods, and selects one of the coded results with smaller code amount, as tile coded data, will be described. In a case where a code amount, as a result of best possible high-quality coding using lossy coding mainly for natural image such as JPEG method recommended as an international standard coding method, is compared with a code amount as a result of lossless coding based on predictive coding, the code amount by the lossless coding is smaller in the case of artificially generated character/line art image and CG image, while the code amount by the lossy coding is smaller in other cases. Since the degradation of image quality in a character/line art portion is conspicuous but that in a natural image portion is comparatively inconspicuous, high compressibility and high image quality can be expected by selecting a coding method based on code amount.

Figure 18:
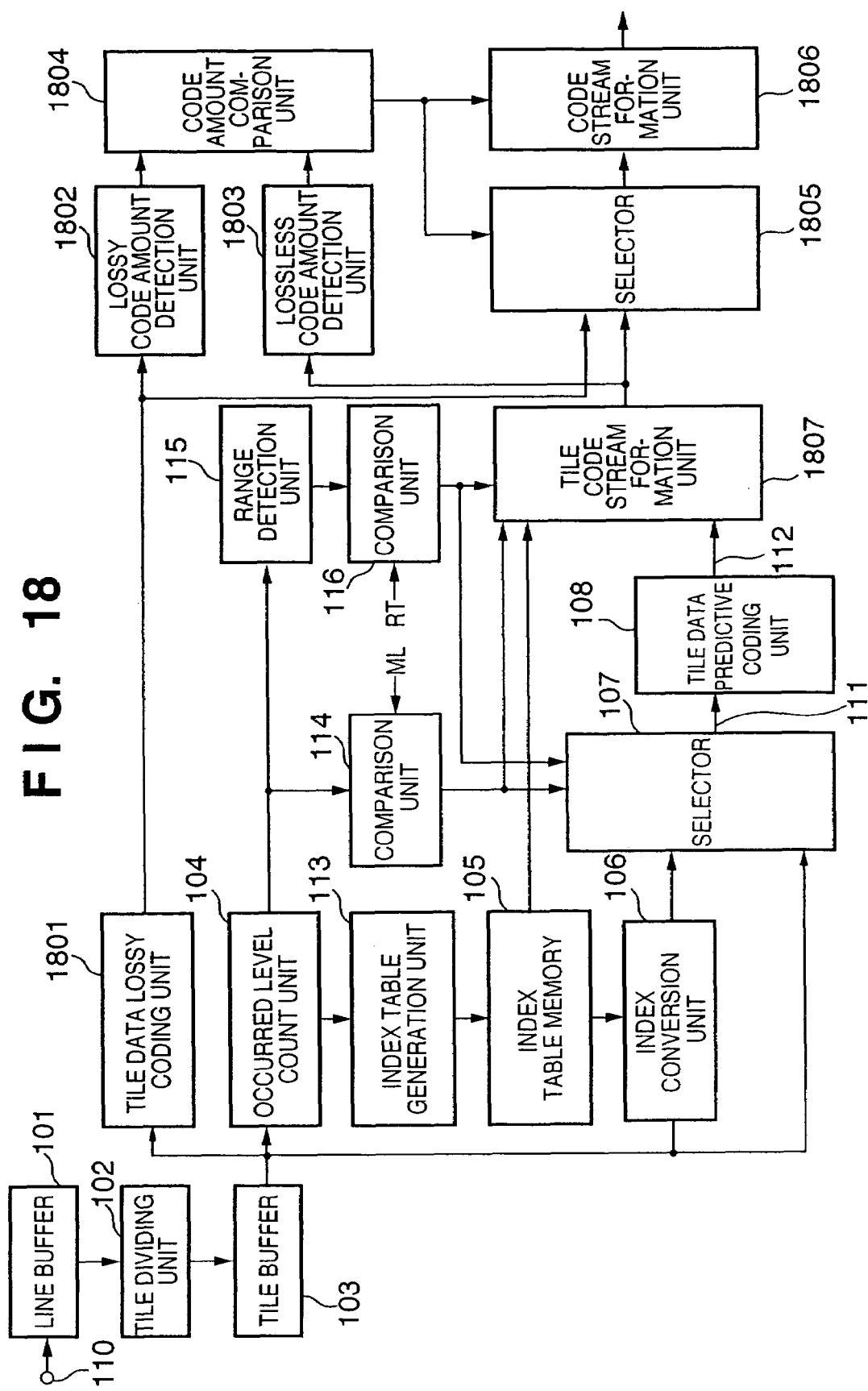
FIG. 18 is a block diagram showing the construction of the image coding apparatus according to a third embodiment of the present invention.

FIG. 18 is a block diagram showing the construction of the image coding apparatus according to a third embodiment of the present invention. In FIG. 18, the elements having the same functions as those in FIGS. 1 and 17 described in the first and second embodiments have the same reference numerals and the explanations of these elements will be omitted. The image processing apparatus of the third embodiment includes the image coding apparatus according to the second embodiment shown in FIG. 17, further provided with a tile-unit lossy coding function and a coding method selection function. In FIG. 18, numeral 1801 denotes a tile data lossy coding unit; 1802, a lossy code amount detection unit; 1803, a lossless code amount detection unit; 1804, a code amount comparison unit; 1805, a selector; 1806, a code stream formation unit; and 1807, a tile code stream formation unit.

Hereinbelow, the difference from the image coding apparatus of the second embodiment will be described.

The tile data lossy coding unit 1801 performs lossy coding by tile, and outputs tile lossy coded data. In the present embodiment, JPEG Baseline as an international standard method is applied, however, other lossy coding such as JPEG2000(ITU-T T.800|ISO/IEC 15444-1) may be employed.

The lossy code amount detection unit 1802 measures a code amount of tile lossy coded data 10, outputted from the tile data lossy coding unit 1801 by tile, and outputs a code amount LH of lossy coded data in tile of interest. The code amount LH is outputted when the lossy coding on the tile of interest by the tile data lossy coding unit 1801 has been completed.

On the other hand, as in the case of the code stream formation unit 109 described in the first embodiment, the tile code stream formation unit 1807 forms tile coded data in the format shown in FIG. 10A or 10B. The code stream formation unit 109 of the first embodiment adds information on the image size and the number of tiles as a stream header to the head of the code stream, and connects respective tile coded data into a code stream as a final output form. The tile code stream formation unit 1807 of the third embodiment performs formation of tile coded data and output of the tile coded data regarding a tile of interest. Hereinafter, for the sake of distinction from the tile lossy coded data outputted from the tile data lossy coding unit 1801, the coded data of tile of interest, outputted from the tile code stream formation unit 1807, will be referred to as "tile lossless coded data".

The lossless code amount detection unit 1803 measures a code amount of tile lossless coded data outputted from the tile code stream formation unit 1807 by tile, and outputs a code amount LK of the lossless coded data in tile of interest. The code amount LK is outputted when all the lossless coded data in the tile of interest has been outputted from the tile code stream formation unit 1807.

The code amount comparison unit 1804 inputs the lossy code amount LH from the lossy code amount detection unit 1802 and the lossless code amount LK from the lossless code amount detection unit 1803, compares these code amounts with each other, and outputs the result of comparison as a selection signal SS. If LK≦LH holds, i.e., the lossless code amount is equal to or less than the lossy code amount, the selection signal SS having a value "1" is outputted. If LK>LH holds, i.e., the lossless code amount is greater than the lossy code amount, the selection signal SS having a value "0" is outputted.

The selector 1805 selects one of the tile lossy coded data generated by the tile data lossy coding unit 1801 and the tile lossless coded data outputted from the tile code stream formation unit 1807, in accordance with the selection signal SS outputted from the code amount comparison unit 1804, and outputs the selected data as coded data of tile of interest. When the value of the selection signal SS is "1", the tile lossless coded data is selected, while if the value of the selection signal SS is "0", the tile lossy coded data is selected. The selector 1805 has a buffer (not shown) for storing the tile lossy coded data generated by the tile data lossy coding unit 1801 and the tile lossless coded data outputted from the tile code stream formation unit 1807.

The code stream formation unit 1806 adds necessary information to the lossless or lossy tile coded data outputted from the selector 1805, thereby forms a code stream as a final output from the apparatus, and outputs the code stream to the outside of the apparatus.

In the first embodiment, an example of the format of coded data outputted from the image output apparatus is shown in FIG. 9, and the tile coded data is as shown in FIGS. 10A and 10B. In the third embodiment, coded data in a similar data format can be formed.

FIGS. 19A and 19B show the formats of tile header data according to the third embodiment. For the sake of appropriate selection of decoding method on the decoding side, the selection signal SS outputted from the code amount comparison unit 1804 is added to the head of the tile coded data. That is, the header of the third embodiment has 4 bit data where 1 bit is added to the tile header 3-bit data as shown in FIGS. 10A and 10B. For the sake of simplicity of explanation, in the tile header 4 bits, the bit 0 to the bit 2 (3 bits) are utilized as identification information as described in the first embodiment, and the bit 3 (the most significant bit) includes the selection signal SS.

Figure 20:
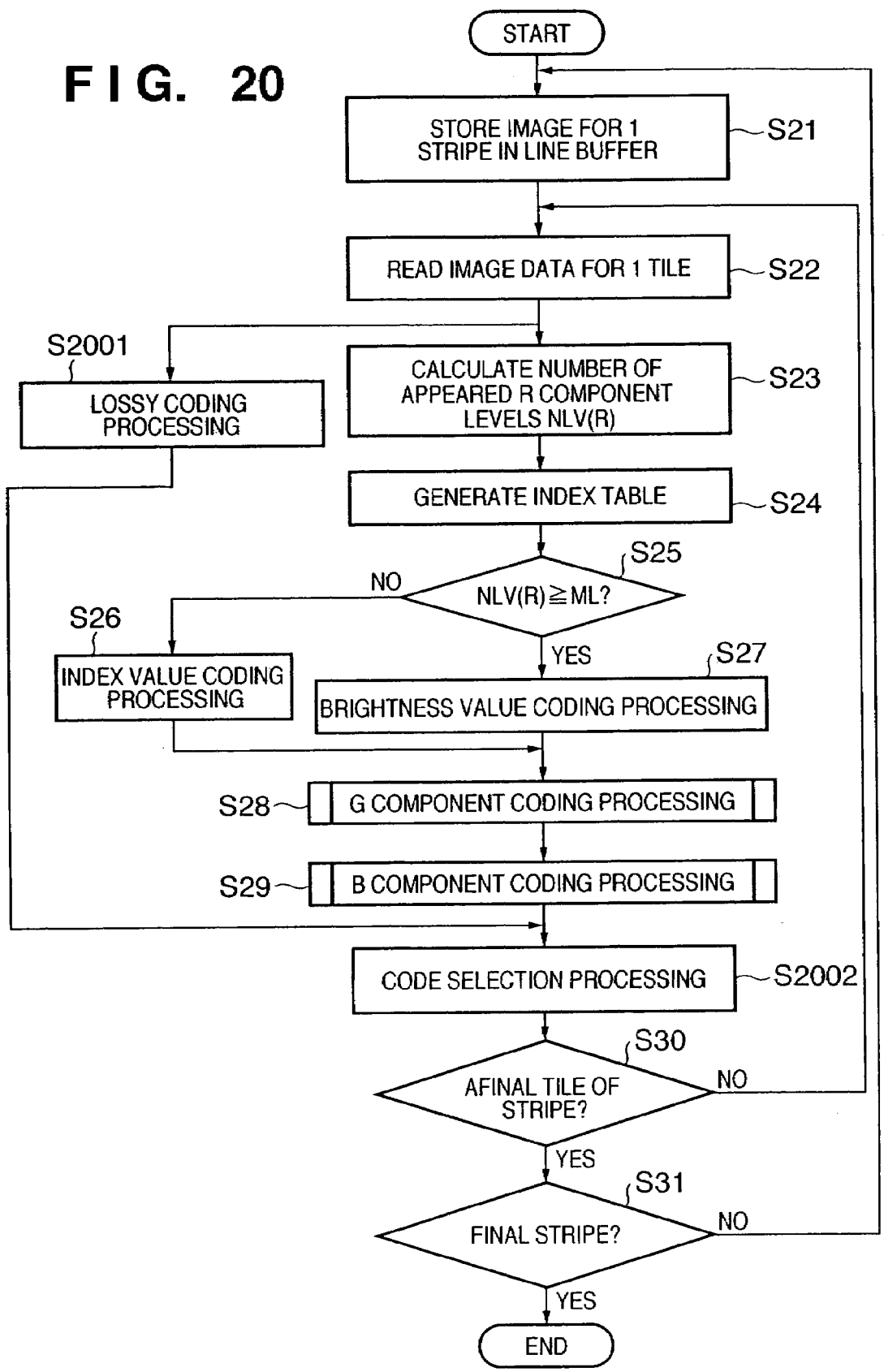
FIG. 20 is a flowchart showing the entire processing procedure in the image coding apparatus according to the third embodiment.

The entire processing procedure of the image coding apparatus according to the third embodiment will be described with reference to the flowchart of FIG. 20. In FIG. 20, the processing steps corresponding to those described in the first embodiment have the same step numbers. Hereinbelow, the processing procedure as a characteristic feature of the third embodiment will be described.

In the image coding apparatus of the present embodiment, at step S22, image data for 1 tile is read, then, in parallel with lossless coding processing at steps S23 to S29, lossy coding is performed by the tile data lossy coding unit 1801 (step S2001). The lossless coding processing at steps S23 to S29 and the lossy coding processing at step S2001 may be performed in parallel or may be performed sequentially. When the lossless coding processing (steps S23 to S29) and the lossy coding processing (step S2001) for the tile of interest have been completed, the code amount LH of tile lossy coded data generated by the tile data lossy coding unit 1801 is measured by the lossy code amount detection unit 1802, and the code amount LK of tile lossless coded data outputted from the tile code stream formation unit 1807 is measured by the lossless code amount detection unit 1803. The code amount comparison unit 1804 compares these code amounts with each other, and the selector 1805 selects a smaller code amount. The selected code amount is embedded in the code stream by the code stream formation unit 1806 (step S2002). The above tile coding processing is performed on all the tiles of the image, thereby coding processing is completed.

Figure 21:
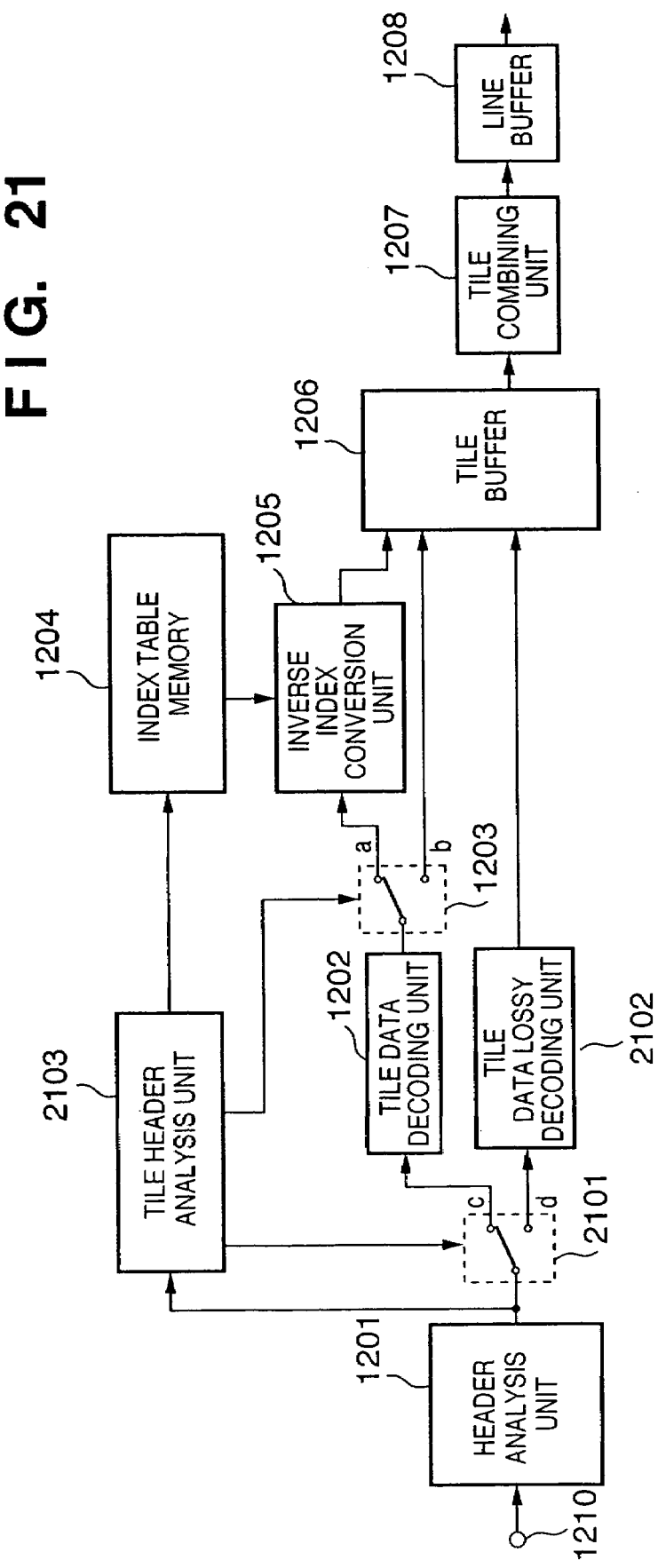
FIG. 21 is a block diagram showing the decoding apparatus according to the third embodiment.

Next, the operation of the decoding apparatus applicable to the third embodiment, having a construction as shown in FIG. 21, will be described. In FIG. 21, the blocks having the same functions as those of the decoding apparatus shown in FIG. 12 have the same reference numerals, and the explanations of these blocks will be omitted. In FIG. 21, numeral 2101 denotes a switch; 2102, a tile data lossy decoding unit; and 2103, a tile header analysis unit.

If the value of the bit 3 of the 4 bits in the input tile header is "0", the tile header analysis unit 2103 turns the switch 2101 to the output terminal d side until decoding processing for all the color components in the 1 tile has been completed, such that the tile data decoding processing is performed by the tile data lossy decoding unit 2102. If the bit 3 is "1", the tile header analysis unit 2103 turns the switch 2101 to the output terminal c side for decoding by the tile data decoding unit 1202. Further, if the bit 3 is "1", the tile header analysis unit 2103 turns the switch 1203 in accordance with the following 3-bit data, as in the case of the tile header analysis unit 1209 described in the first embodiment, so as to use/exclude the inverse index conversion unit 1205.

The tile data lossy decoding unit 2102 performs processing inverse of the processing by the tile data lossy coding unit 1801, thereby decodes tile data from the tile lossy coded data, and stores the decoded data into the tile buffer 1206.

Figure 22:
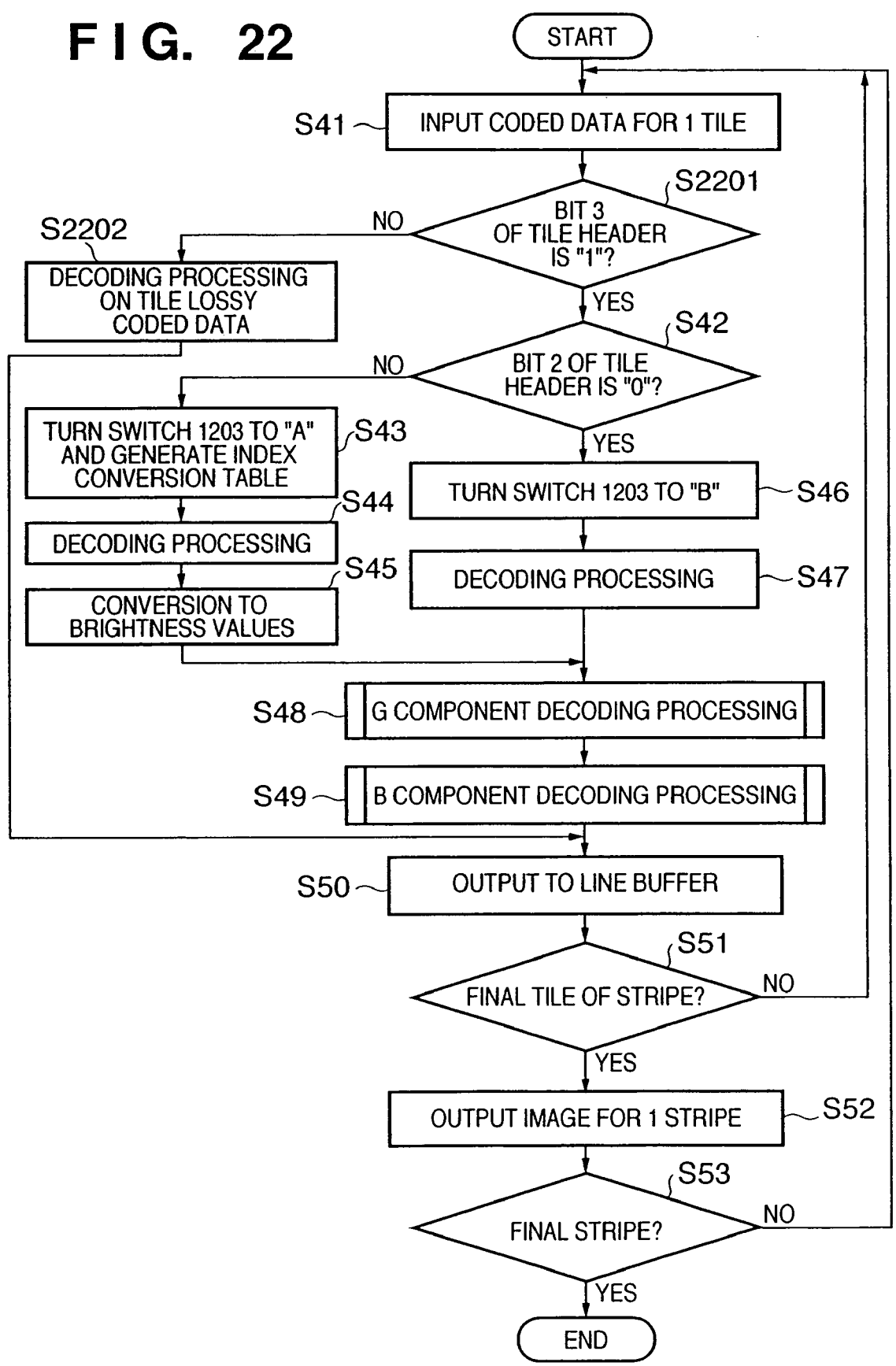
FIG. 22 is a flowchart showing a processing procedure in the decoding apparatus according to the third embodiment.

FIG. 22 is a flowchart showing the entire procedures of decoding processing. In FIG. 22, the processing steps corresponding to those in the decoding processing in FIG. 14 described in the first embodiment have the same step numbers and the explanations of these steps will be omitted.

At step S41, coded data for 1 tile is inputted, then at step S2201, tile header analysis is performed by the tile header analysis unit 2103. If the value of the top bit (bit 3) of the tile header data is "1", the switch 2101 is turned to the output terminal c side such that decoding from tile lossless coded data to tile data is performed at steps S42 to S49. On the other hand, if the value of the top bit (bit 3) is "0", the switch 2101 is turned to the output terminal d side such that decoding from tile lossy coded data to tile data is performed at step S2202.

At step S2202, the tile lossy decoding unit 2102 decodes the data of the tile of interest from the tile lossy coded data, and stores the coded data into the tile buffer 1206.

As described above, according to the third embodiment, image data is divided into plural small block areas (tiles in the embodiment), and in each small area, the number of occurred levels of each color component is counted. If the number of occurred levels is equal to or less than a predetermined value, the brightness values are converted to index values, and subjected to predictive coding. If the number of occurred levels is greater than the predetermined value, the brightness values are subjected to predictive coding. Thus, lossless coding is performed. In addition to this processing, each block is lossy encoded, lossless and lossy code amounts are compared with each other, and a smaller code amount is selected for formation of code stream, thus a coding method is appropriately selected. For example, the lossy coding is selected for a natural image portion where the degradation of image quality is inconspicuous, for improvement in compression performance, while the lossless coding is selected for a character/line art portion where the degradation of image quality is conspicuous. In this manner, both high compression efficiency and high image quality can be attained by appropriately selecting a coding method. Further, as the lossless code amount can be improved in character/line art and CG image portions, the possibility of lossy coding in these portions is reduced, and selection with higher accuracy can be realized.

The image coding apparatus and the image decoding apparatus described in the present embodiment are preferably applicable to compression/decompression of raster image generated from PDL inside a printer controller.

Note that as in the case of the first embodiment, the third embodiment is applicable to a computer program and a computer-readable storage medium.

The present invention is not limited to the above-described embodiments. For example, it may be arranged such that immediately previous data of data of interest is used as a prediction value as a method for predicting a pixel value as a subject of coding. Further, it may be arranged such that plural prediction methods are prepared and appropriately selected.

Further, Huffman coding is employed as an entropy coding method, however, any other block coding such as Golomb-Rice coding, or arithmetic coding using block code or a static probability model may be employed. Further, a coding method adaptively selecting run-length coding and predictive coding may be employed.

Further, the index conversion method is not limited to that in the above-described embodiments. In the embodiments, a flag array is prepared for determination of occurred/unoccurred states of all the brightness levels, and an index conversion table is generated based on the flag array. However, any other method may be used as long as it is a method for conversion to index values and generation of conversion table information included in a code stream. For example, the conversion table information may be directly generated by examining brightness level values of a component in 1 tile in the order of raster scanning, and storing only first-occurred values, while sorting them, into a memory or a register array.

Further, in the second embodiment, as another method for obtaining the degree of discrete distribution, it may be arranged such that the difference between existing maximum brightness Max(c) and minimum brightness Min(c), "Max(c)–Min(c)" is divided by NLV(c), thereby a mean distance between brightness values is obtained. The mean distance is compared with an appropriate threshold value, and if the mean distance is greater than the threshold value, coding based on index value is performed, while if the mean distance is equal to or less than the threshold value, coding using brightness value is performed. Further, it may be arranged depending on the circumstances such that the flag array F(c, 0) to F(c, 255) is sequentially examined and the distribution state is determined based on the number of 0-1 changing points.

Further, in the embodiments, 1 pixel is represented by respectively 8-bit R, G and B color component data, however, it is apparent that this does not pose any limitation on the present invention. Further, an image may be represented in YMC color space or YCbCr color space. Further, a monochrome gray-scale image instead of color image may be handled.

Further, in the embodiments, the respective sizes in horizontal and vertical directions of an original image as a subject of coding are integral multiples of sizes in the horizontal and vertical directions of a tile, however, this relation is used merely for the sake of convenience but the horizontal and vertical sizes of the original are not necessarily integral multiples of the horizontal and vertical sizes of the tile. In a case where a complete tile size cannot be obtained in e.g. an end portion, processing may be performed in accordance with the incomplete size. Further, on the decoding side, processing can be normally performed in the end portion by including the information on the incomplete size in the header or the like.

As described above, according to the present invention, coding with high efficiency can be performed on image data having discrete pixel values such as a CG image or a limited color image, as well as a natural image where pixel value changes are mild.

As many apparently widely different embodiments of the present invention can be made without departing from the spirit and scope thereof, it is to be understood that the invention is not limited to the specific embodiments thereof except as defined in the appended claims.

CLIAM OF PRIORITY

This application claims priority from Japanese Patent Applications No. 2004-139098 filed on May 7, 2004 and No. 2005-006668 filed on Jan. 13, 2005, which are hereby incorporated by reference herein.

What is claimed is:

1. An image coding apparatus for encoding multi-valued image data, comprising:
   a block dividing unit configured to divide multi-valued image data into a plurality of blocks having pixel values;
   a determination unit configured to determine, by block, whether an occurrence distribution of the pixel values, existing in a block from the plurality of blocks, along an axis of a possible pixel value range, is discrete;
   a conversion unit, responsive to the determination unit determining that the occurrence distribution of the pixel values is discrete, to convert the pixel values in the block into index values by allocating continuous index values to each distinct pixel value existing in the block so that the number of types of index values coincides with the number of pixel types represented by the number of distinct pixel values;
   a predictive coding unit configured to:
   perform predictive coding on the pixel values in the block if said determination unit determines that the occurrence distribution of pixel values in the block is not discrete, and
   perform the predictive coding on the index values converted by said conversion unit, as if the index values are pixel values, if said determination unit determines that the occurrence distribution of pixel values in the block is discrete,
   wherein the units are formed by at least one computer processor.

2. The image coding apparatus according to claim 1, further comprising:
   a lossy coding unit configured to perform lossy coding on at least one block from the plurality of blocks; and
   a code data selection unit configured to select one of codes generated by said lossy coding unit and codes generated by said predictive coding unit for the at least one block, based on the amount of codes generated by said lossy coding unit and the amount of codes generated by said predictive coding unit.

3. The image coding apparatus according to claim 1, wherein said determination unit counts the number of pixel types existing in at least one block from the plurality of blocks, and determines whether or not said occurrence distribution is discrete based on a count value.

4. The image coding apparatus according to claim 1, wherein said determination unit has:
   a count unit configured to count a number indicating the number of pixel types existing in at least one block from the plurality of blocks; and
   a difference calculation unit configured to calculate an difference value between a maximum pixel value and a minimum pixel value existing in the at least one block,
   and wherein said determination unit determines whether or not said occurrence distribution is discrete based on the count value obtained by said count unit and the error value calculated by said difference calculation unit.

5. The image coding apparatus according to claim 1, wherein when 1 pixel of said image data is represented by plural component values, said determination unit, said conversion unit and said predictive coding unit are activated for each component.

6. The image coding apparatus according to claim 5, wherein said predictive coding unit is an entropy coding unit using Huffman codes.

7. The image coding apparatus according to claim 5, wherein said predictive coding unit is an entropy coding unit using Golomb codes.

8. An image decoding apparatus for decoding code data encoded by the image coding apparatus in claim 1, comprising:
   an input unit configured to input coded data by block;
   a determination unit configured to determine whether coded data in an input block is the result of predictive coding using index values or the result of predictive coding using pixel values instead of index values;
   a decoding unit configured to perform predictive decoding on the coded data in the input block;
   an inverse conversion unit configured to convert the index values, as values decoded by said decoding unit, into pixel values; and
   an output control unit configured to, if it is determined that the coded data in the input block is the result of said coding using pixel values, output the result of decoding by said decoding unit as a decoded block, while if it is determined that the coded data in the input block is the result of said coding using index values, outputting the pixel values obtained by said inverse conversion unit as the decoded block.

9. The image decoding apparatus according to claim 8, further comprising:
   a coding method determination unit configured to determine whether the coded data in the input block is the result of lossy coding or the result of predictive lossless coding; and
   a lossy coded data decoding unit configured to decode the coded data in the input block by a lossy coding method,
   wherein if it is determined that the coded data in the input block is the result of lossy coding, the coded data in the input block is decoded by said lossy coded data decoding unit, while if it is determined that the coded data in the input block is the result of predictive coding, the coded data in the input block is decoded by said decoding unit.

10. A control method for image coding apparatus for encoding multi-valued image data, comprising:
    a block dividing step of dividing image data into a plurality of blocks having pixel values;
    a determination step of determining, by block, whether an occurrence distribution of the pixel values, existing in a block from the plurality of blocks, along an axis of a possible pixel value range, is discrete;
    a conversion step of, by allocating continuous index values to the pixel values existing in the block so that the number of types of index values coincides with the number of pixel types represented by a pixel value, converting the pixel values in the block into index values, in response to a determination that the occurrence distribution of the pixel values is discrete;
    a predictive coding step of performing predictive coding on the pixel values in the block if it is determined in said determination step that the occurrence distribution of pixel values in the block is not discrete, while, performing predictive coding the index values, as if the index values are pixel values, converted in said conversion step if it is determined in said determination step that the occurrence distribution of pixel values in the block is discrete,
    wherein the steps are performed by at least one computer processor.

11. The control method for image coding apparatus according to claim 10, further comprising:
    a lossy coding step of performing lossy coding on at least one block of the plurality of blocks; and
    a code data selection step of selecting one of codes generated by said lossy coding step and codes generated at said predictive coding step for the at least one block, based on the amount of codes generated at said lossy coding step and the amount of codes generated at said predictive coding step.

12. A control method for an image decoding apparatus for decoding code data encoded by the image coding apparatus in claim 1, comprising:
    an input step of inputting coded data by block;
    a determination step of determining whether coded data in an input block is the result of predictive coding using index values or the result of predictive coding using pixel values instead of index values;
    a decoding step of performing predictive decoding on the coded data in the input block;
    a inverse conversion step of converting the index values, as values decoded at said decoding step, into pixel values; and
    an output control step of, if it is determined that the coded data in the input block is the result of said coding using pixel values, outputting the result of decoding at said decoding step as a decoded block, while if it is determined that the coded data in the input block is the result of said coding using index values, outputting the pixel values obtained at said inverse conversion step as the decoded block.

13. The control method for image decoding apparatus according to claim 12, further comprising:
    a coding method determination step of determining whether the coded data in the input block is the result of lossy coding or the result of predictive lossless coding; and a lossy coded data decoding step of decoding the coded data in the input block by a lossy coding method, wherein if it is determined that the coded data in the input block is the result of lossy coding, the coded data in the input block is decoded at said lossy coded data decoding step, while if it is determined that the coded data in the input block is the result of predictive coding, the coded data in the input block is decoded at said decoding step.

14. A computer readable storage medium having stored thereon a plurality of instructions, said plurality of instructions when executed by one or more processors, cause said one or more processors to perform:

dividing image data to be encoded into a plurality of blocks having pixel values;

determining, by block, whether an occurrence distribution of the pixel values, existing in a block from the plurality of blocks, along an axis of a possible pixel value range, is discrete;

allocating continuous index values to the pixel values existing in the block so that the number of types of index values coincides with the number of pixel types represented by a pixel value, converting the pixel values in the block into index values in response to a determination that the occurrence distribution of the pixel values is discrete;

performing predictive coding of the pixel values in the block if it is determined in said determination step that the occurrence distribution of pixel values in the block is not discrete, while, performing the predictive coding of the index values, as if the index values are pixel values, converted in said conversion step if it is determined in said determination step that the occurrence distribution of pixel values in the block is discrete.

15. The apparatus according to claim 1, wherein said predictive coding unit outputs predictive coded data of the block and identification data indicating whether the block has been encoded using either pixel values or index values, and wherein said predictive coding unit further outputs a conversion table, as encoded data of the block, for converting index values into pixel values if the identification data indicates that the block has been encoded using index values.

\* \* \* \* \*